(12) United States Patent
Sakamoto

(10) Patent No.: US 10,097,840 B2
(45) Date of Patent: Oct. 9, 2018

(54) IMAGE ENCODING APPARATUS, CONTROL METHOD THEREOF, AND STORAGE MEDIUM

(71) Applicant: CANON KABUSHIKI KAISHA, Tokyo (JP)

(72) Inventor: Daisuke Sakamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 15/299,048

(22) Filed: Oct. 20, 2016

(65) Prior Publication Data

US 2017/0118476 A1    Apr. 27, 2017

(30) Foreign Application Priority Data

Oct. 27, 2015 (JP) ................. 2015-211103

(51) Int. Cl.
*H04N 19/00* (2014.01)
*H04N 19/186* (2014.01)
*H04N 19/124* (2014.01)
*H04N 19/635* (2014.01)
*G06T 3/40* (2006.01)
*G06T 5/00* (2006.01)
*H04N 19/15* (2014.01)
*H04N 19/63* (2014.01)
(Continued)

(52) U.S. Cl.
CPC ......... *H04N 19/186* (2014.11); *G06T 3/4015* (2013.01); *G06T 5/002* (2013.01); *H04N 19/103* (2014.11); *H04N 19/124* (2014.11); *H04N 19/15* (2014.11); *H04N 19/63* (2014.11); *H04N 19/635* (2014.11); *H04N 5/378* (2013.01); *H04N 2209/046* (2013.01)

(58) Field of Classification Search
CPC .. H04N 19/186; H04N 19/103; H04N 19/124; H04N 19/15; H04N 19/63; H04N 19/635; H04N 5/378; H04N 2209/046; G06T 3/4015; G06T 5/002
See application file for complete search history.

(56) References Cited

U.S. PATENT DOCUMENTS 7,480,417 B2    1/2009 Malvar ................. 382/244
8,363,717 B2    1/2013 Togita et al. ........ 375/240.03
(Continued)

FOREIGN PATENT DOCUMENTS

JP    2003-125209    4/2003
JP    2006-121669    5/2006

OTHER PUBLICATIONS

U.S. Appl. No. 15/299,073, filed Oct. 20, 2016.

*Primary Examiner* — Ping Hsieh
(74) *Attorney, Agent, or Firm* — Fitzpatrick, Cella, Harper & Scinto

(57) ABSTRACT

The present invention provides a technique for encoding Bayer array RAW image data that responds to whether priority is placed on encoding efficiency or on image quality. To that end, a first plane transforming unit transforms the RAW image data into R, G0, G1, and B planes. A second plane transforming unit transforms the RAW image data into a luminance plane and three color difference planes, each constituted of a different color difference component. It is then determined whether to encode using the first plane transforming unit or the second plane transforming unit, and the planes are then encoded according to the determination.

6 Claims, 24 Drawing Sheets

(51) Int. Cl.
*H04N 19/103* (2014.01)
*H04N 5/378* (2011.01)

(56) References Cited

U.S. PATENT DOCUMENTS

| | | | |
|---|---|---|---|
| 2005/0276328 A1 | 12/2005 | Sakamoto | 275/240.16 |
| 2005/0276475 A1* | 12/2005 | Sawada | H04N 1/648 |
| | | | 382/167 |
| 2006/0083432 A1* | 4/2006 | Malvar | H04N 1/64 |
| | | | 382/232 |
| 2013/0177074 A1 | 7/2013 | Togita et al. | 375/240.03 |
| 2015/0201209 A1 | 7/2015 | Sakamoto | 375/240.16 |
| 2015/0334359 A1* | 11/2015 | Hayashi | G06T 5/003 |
| | | | 348/242 |

* cited by examiner

FIG. 8

Co PLANE SUB-BANDS

| LL BLOCK | HL BLOCK |
|---|---|
| LH BLOCK | HH BLOCK |

ABSOLUTE VALUE SUM Wh_sumCo OF WAVELET COEFFICIENT IN HL, LH, HH BLOCKS, ASIDE FROM LL BLOCK Cg PLANE SUB-BANDS

| LL BLOCK | HL BLOCK |
|---|---|
| LH BLOCK | HH BLOCK |

ABSOLUTE VALUE SUM Wh_sumCg OF WAVELET COEFFICIENT IN HL, LH, HH BLOCKS, ASIDE FROM LL BLOCK Dg PLANE SUB-BANDS

| LL BLOCK | HL BLOCK |
|---|---|
| LH BLOCK | HH BLOCK |

ABSOLUTE VALUE SUM Wh_sumDg OF WAVELET COEFFICIENT IN HL, LH, HH BLOCKS, ASIDE FROM LL BLOCK

F I G. 10

Co PLANE SUB-BAND IMAGE

| LL2 | HL2<br>PICTURE ABSOLUTE VALUE SUM<br>Wh_sumCoHL2 OF WAVELET<br>COEFFICIENT FOR HL2 BLOCK | HL1<br>PICTURE ABSOLUTE VALUE SUM<br>Wh_sumCoHL1 OF<br>WAVELET COEFFICIENT<br>FOR HL1 BLOCK |
|---|---|---|
| LH2<br>PICTURE ABSOLUTE VALUE<br>SUM Wh_sumCoLH2 OF WAVELET<br>COEFFICIENT FOR LH2 BLOCK | HH2<br>PICTURE ABSOLUTE VALUE SUM<br>Wh_sumCoHH2 OF WAVELET<br>COEFFICIENT FOR HH2 BLOCK | |
| LH1<br>PICTURE ABSOLUTE VALUE SUM<br>Wh_sumCoLH1 OF<br>WAVELET COEFFICIENT<br>FOR LH1 BLOCK | | HH1<br>PICTURE ABSOLUTE VALUE SUM<br>Wh_sumCoHH1 OF<br>WAVELET COEFFICIENT<br>FOR HH1 BLOCK |

Cg PLANE SUB-BAND IMAGE

| LL2 | HL2<br>PICTURE ABSOLUTE VALUE SUM<br>Wh_sumCgHL2 OF WAVELET<br>COEFFICIENT FOR HL2 BLOCK | HL1<br>PICTURE ABSOLUTE VALUE SUM<br>Wh_sumCgHL1 OF<br>WAVELET COEFFICIENT<br>FOR HL1 BLOCK |
|---|---|---|
| LH2<br>PICTURE ABSOLUTE VALUE<br>SUM Wh_sumCgLH2 OF WAVELET<br>COEFFICIENT FOR LH2 BLOCK | HH2<br>PICTURE ABSOLUTE VALUE SUM<br>Wh_sumCgHH2 OF WAVELET<br>COEFFICIENT FOR HH2 BLOCK | |
| LH1<br>PICTURE ABSOLUTE VALUE SUM<br>Wh_sumCgLH1 OF<br>WAVELET COEFFICIENT<br>FOR LH1 BLOCK | | HH1<br>PICTURE ABSOLUTE VALUE SUM<br>Wh_sumCgHH1 OF<br>WAVELET COEFFICIENT<br>FOR HH1 BLOCK |

Dg PLANE SUB-BAND IMAGE

| LL2 | HL2<br>PICTURE ABSOLUTE VALUE SUM<br>Wh_sumDgHL2 OF WAVELET<br>COEFFICIENT FOR HL2 BLOCK | HL1<br>PICTURE ABSOLUTE VALUE SUM<br>Wh_sumDgHL1 OF<br>WAVELET COEFFICIENT<br>FOR HL1 BLOCK |
|---|---|---|
| LH2<br>PICTURE ABSOLUTE VALUE<br>SUM Wh_sumDgLH2 OF WAVELET<br>COEFFICIENT FOR LH2 BLOCK | HH2<br>PICTURE ABSOLUTE VALUE SUM<br>Wh_sumDgHH2 OF WAVELET<br>COEFFICIENT FOR HH2 BLOCK | |
| LH1<br>PICTURE ABSOLUTE VALUE SUM<br>Wh_sumDgLH1 OF<br>WAVELET COEFFICIENT<br>FOR LH1 BLOCK | | HH1<br>PICTURE ABSOLUTE VALUE SUM<br>Wh_sumDgHH1 OF<br>WAVELET COEFFICIENT<br>FOR HH1 BLOCK |

F I G. 12
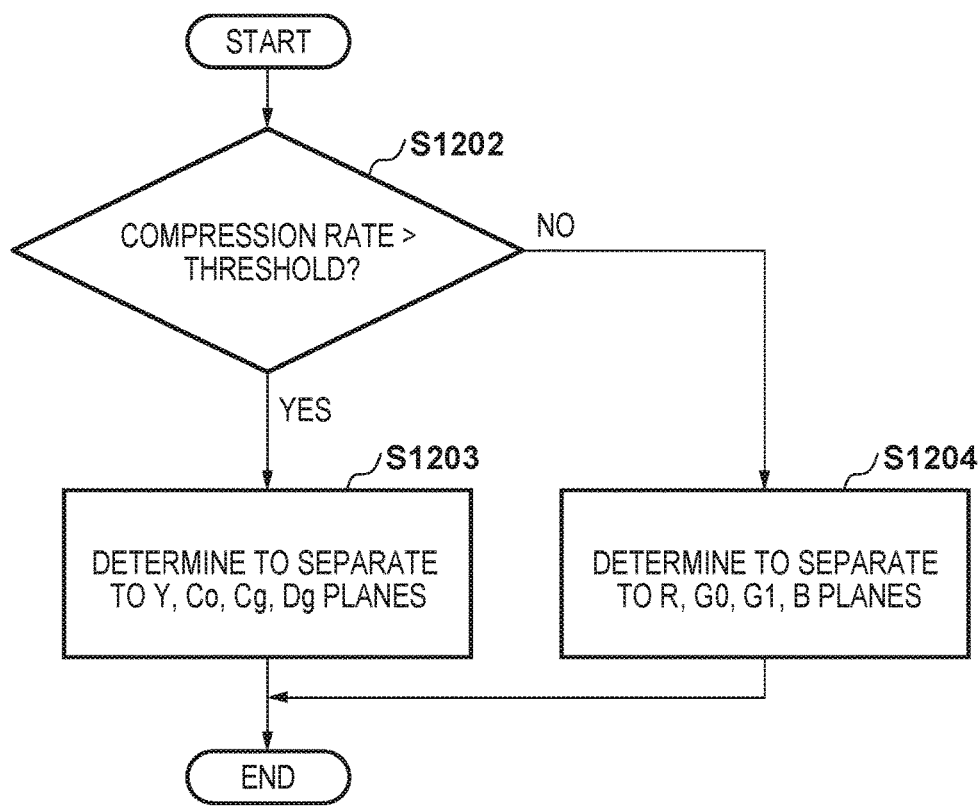

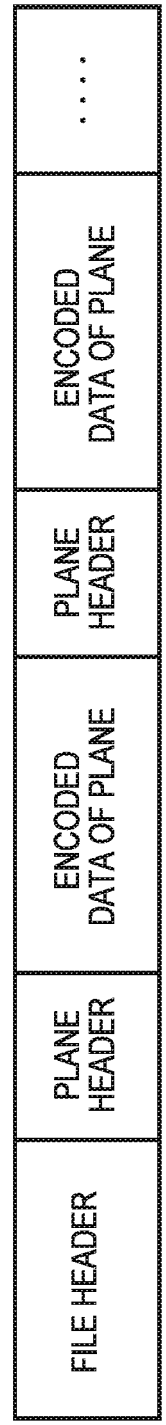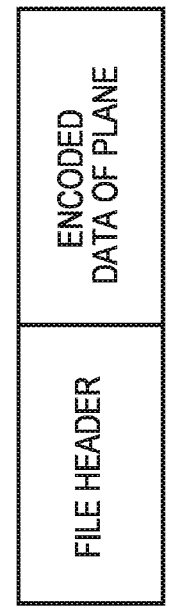

IMAGE ENCODING APPARATUS, CONTROL METHOD THEREOF, AND STORAGE MEDIUM

BACKGROUND OF THE INVENTION

Field of the Invention

The present invention relates to techniques for encoding Bayer array RAW image data.

Description of the Related Art

CCD sensors or CMOS sensors are recently being employed as image sensors in image capturing apparatuses such as digital cameras. Such sensors use a color filter array (called a "CFA" hereinafter) on the surface of the sensor to produce a single color component with a single pixel. Using a CFA makes it possible to obtain Bayer array image data (called "RAW image data" hereinafter), in which R (red), G0 (green), B (blue), and G1 (green) pixels are arranged in a 2×2 cyclical pattern, as illustrated in FIG. 2. Human vision has a property of being particularly sensitive to luminance components. In light of this, in a typical Bayer array, the number of pixels having a green component, which contains a high level of luminance components, is twice the number of pixels having a red component or a blue component, as illustrated in FIG. 2. In RAW image data, a single pixel only contains information of a single color component. As opposed to this, a single pixel in a normal color image to be viewed by a human is constituted of three components, namely red, blue, and green. Accordingly, RAW image data is transformed into RGB image data, in which a single pixel has the three components of red, blue, and green, by subjecting the RAW image data to a process known as demosaicing. Generally, RGB image data obtained from demosaicing or YUV image data obtained by transforming RGB image data is subjected to an encoding process in order to reduce the data amount. However, the demosaicing process results in a single pixel having three color components, which means that the demosaiced image data will have three times more data than the RAW image data. For this reason, methods for directly encoding and recording RAW image data prior to demosaicing are being proposed.

Japanese Patent Laid-Open No. 2003-125209 ("Document 1" hereinafter) discloses a method in which image data is separated into four planes, namely image data constituted of a Bayer array R component, image data constituted of a G0 component, image data constituted of a B component, and image data constituted of a G1 component, and each plane is then encoded.

Meanwhile, Japanese Patent Laid-Open No. 2006-121669 ("Document 2" hereinafter) discloses a method in which RAW image data is separated into four planes, namely R, G0, B, and G1, in the same manner as in Document 1, which are then transformed approximately into a luminance Y and color differences Co, Cg, Dg and encoded.

In the method according to Document 1, the G0 component and the G1 component, which are spatially close and have high correlation due to being the same color, are encoded as separate planes. Thus the encoding in this method is less efficient than in cases where both the G0 and G1 components are encoded as a single plane.

On the other hand, the method according to Document 2 allocates a higher amount of code to the luminance (Y) plane on the basis of the properties of human vision, which makes it possible to prevent a drop in resolution while also encoding more efficiently than the method according to Document 1. However, in the case where data has been encoded using the method according to Document 2, if, for example, a user carries out development and color grading through a decoding process, it is possible that unanticipated color noise will arise depending on how that process is configured.

SUMMARY OF THE INVENTION

The present invention provides a technique for encoding Bayer array RAW image data in accordance with whether priority is placed on encoding efficiency or on image quality. The present invention also provides a technique for encoding that suppresses a drop in image quality from RAW image data while also prioritizing the encoding efficiency of RAW image data.

According to an aspect of the invention, there is provided an encoding apparatus that encodes Bayer array image data, the apparatus comprising: a first transforming unit that transforms image data into a first plane group constituted of a total of four planes, the four planes being an R plane constituted of an R component, a G0 plane constituted of a G0 component, a G1 plane constituted of a G1 component, and a B plane constituted of a B component; a second transforming unit that transforms image data into a second plane group constituted of a total of four planes, the four planes including a luminance plane constituted of a luminance component and a color difference plane constituted of a color difference component; an encoding unit that encodes each plane; and a control unit that switches between encoding the first plane group using the encoding unit and encoding the second plane group using the encoding unit on the basis of a quality of the image data.

According to the present invention, a technique for encoding Bayer array RAW image data that responds to whether priority is placed on encoding efficiency or on image quality can be provided. Additionally, according to another aspect of the invention, a technique for encoding that suppresses a drop in image quality from RAW image data while also prioritizing the encoding efficiency of RAW image data can be provided.

Further features of the present invention will become apparent from the following description of exemplary embodiments (with reference to the attached drawings).

BRIEF DESCRIPTION OF THE DRAWINGS

FIG. 8 is a diagram illustrating sub-bands in the case where a single wavelet transform is applied to color difference planes.

FIG. 10 is a diagram illustrating sub-bands in the case where two wavelet transforms are applied to color difference planes.

FIG. 12 is a flowchart illustrating a sequence of processing performed by a plane determining unit according to the fourth embodiment.

FIGS. 16A and 16B are diagrams illustrating the file structures of a moving picture and a still image according to an embodiment.

DESCRIPTION OF THE EMBODIMENTS

Hereinafter, embodiments of the present invention will be described in detail with reference to the appended drawings. Note that the present invention relates to the encoding of Bayer array RAW image data, and the type of the source of that RAW image data is of no consequence. For example, a storage medium may be the source of the RAW image data. However, to facilitate understanding, the following embodiments will describe the encoding of RAW image data in an image capturing apparatus that includes a Bayer array image sensor.

First Embodiment

Figure 15:
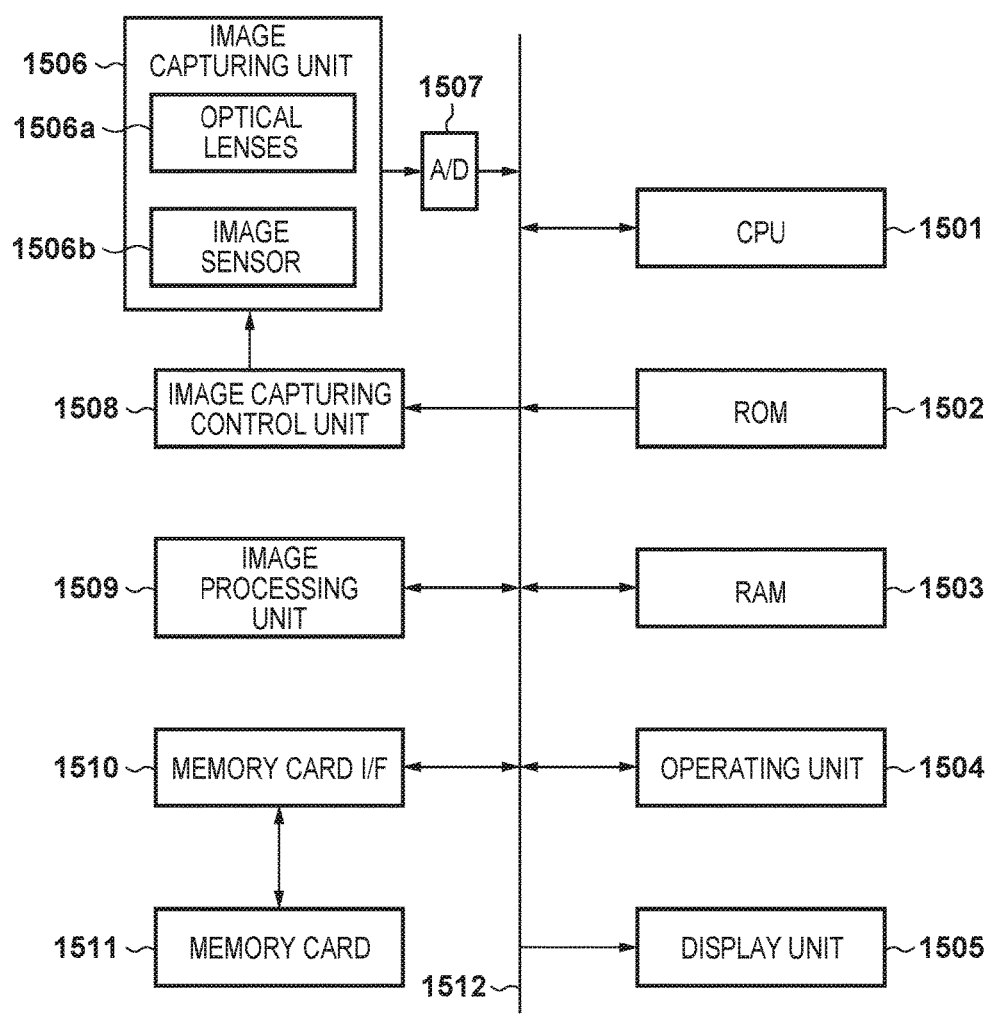
FIG. 15 is a block diagram illustrating an image capturing apparatus to which an embodiment has been applied.

FIG. 15 is a block diagram illustrating an image capturing apparatus to which an embodiment has been applied. A CPU 1501 controls the various constituent elements described below, which are connected to a bus 1512, by executing programs. A ROM 1502 holds various types of data necessary to configure the apparatus as well as the programs executed by the CPU 1501. A RAM 1503 functions as a work area for the CPU 1501, various types of buffers, and so on. An operating unit 1504 includes a power on/off switch, a switch for instructing image capturing and recording, a switch for changing modes, as well as a touch panel. A display unit 1505 is a flat-type display such as a liquid-crystal display, and displays various types of menus, captured images, and the like. The touch panel of the operating unit 1504 is provided on a front surface of a display screen of this display unit 1505. A user can therefore touch various types of menu items displayed in the display screen with his/her finger to select those items. The operating unit 1504 and the display unit 1505 thus function as a user interface. An image capturing unit 1506 includes optical lenses 1506a such as a focus lens and a zoom lens, and an image sensor 1506b that transforms an image that has been formed into an electrical signal. The image sensor 1506b has a Bayer-type color filter array. The electrical signal obtained from the image sensor 1506b is converted into digital image data by an A/D converter 1507. The digital image data from the A/D converter 1507 is Bayer array data and data that has not yet undergone various types of image processes. As such, the Bayer array digital image data immediately after the conversion by the A/D converter 1507 will be called "RAW data" hereinafter. An image capturing control unit 1508 adjusts the positions of the zoom lens, the focus lens, and so on of the optical lenses 1506a in the image capturing unit 1506 under the control of the CPU 1501. An image processing unit 1509 carries out a white balance process, a process for transforming the RAW data into the three RGB components per pixel for display in the display unit 1505, and furthermore, a compression/encoding process on the captured RAW data and a corresponding decoding process. A memory card interface 1510 writes to and reads from a removable memory card (an SD card, for example) 1511 under the control of the CPU 1501.

The foregoing has described the basic configuration of the image capturing apparatus according to the embodiment. A focusing process carried out by the image capturing control unit 1508 when capturing an image, the white balance process performed by the image processing unit 1509, the process for transforming the RAW data into RGB data for display, and so on are not of primary concern to the present invention and thus will not be described. The encoding of RAW data performed by the image processing unit 1509 in the case where the operating unit 1504 has been used to instruct the start of moving picture capturing and recording will be described next.

Figure 1:
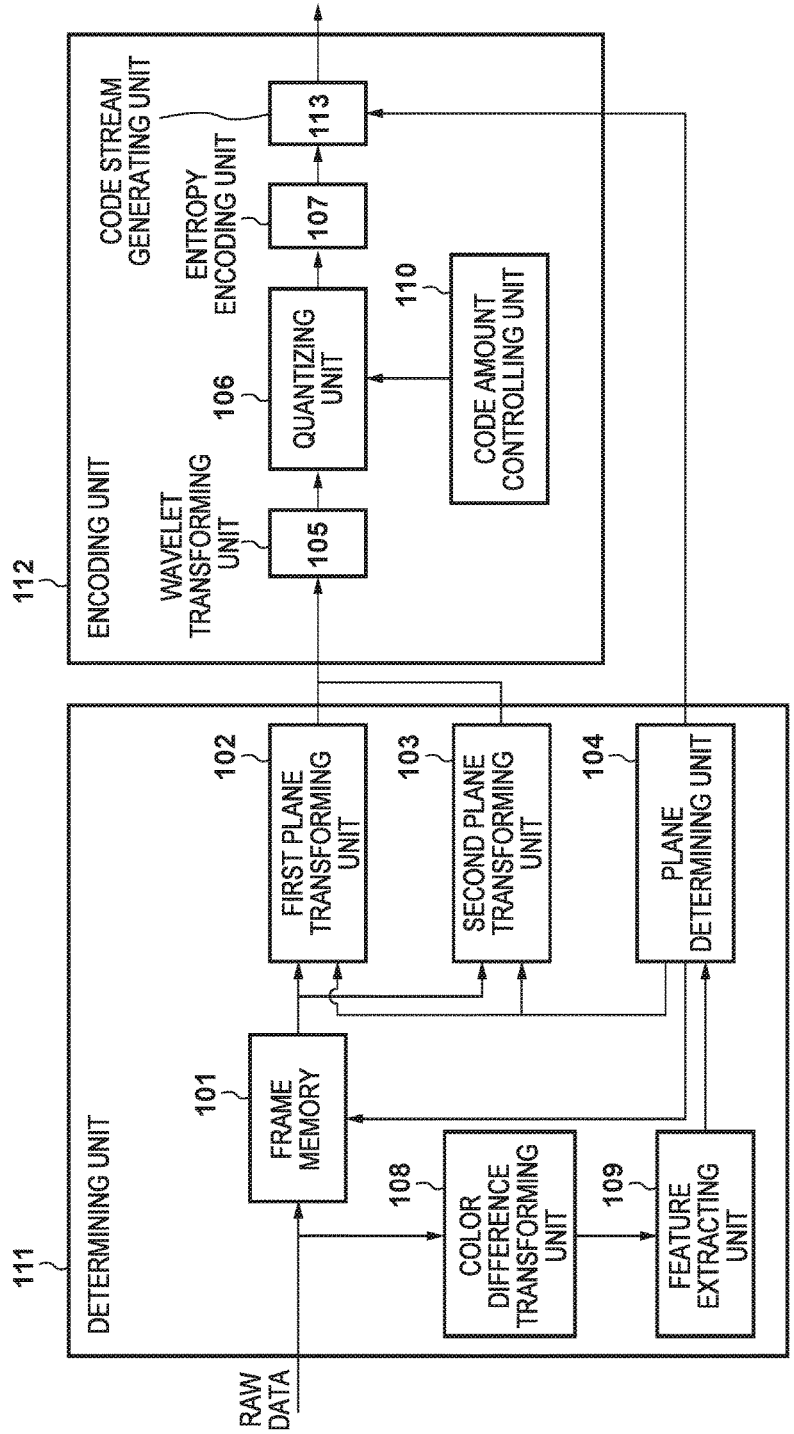
FIG. 1 is a block diagram illustrating an encoding apparatus according to a first embodiment.
Figure 2:
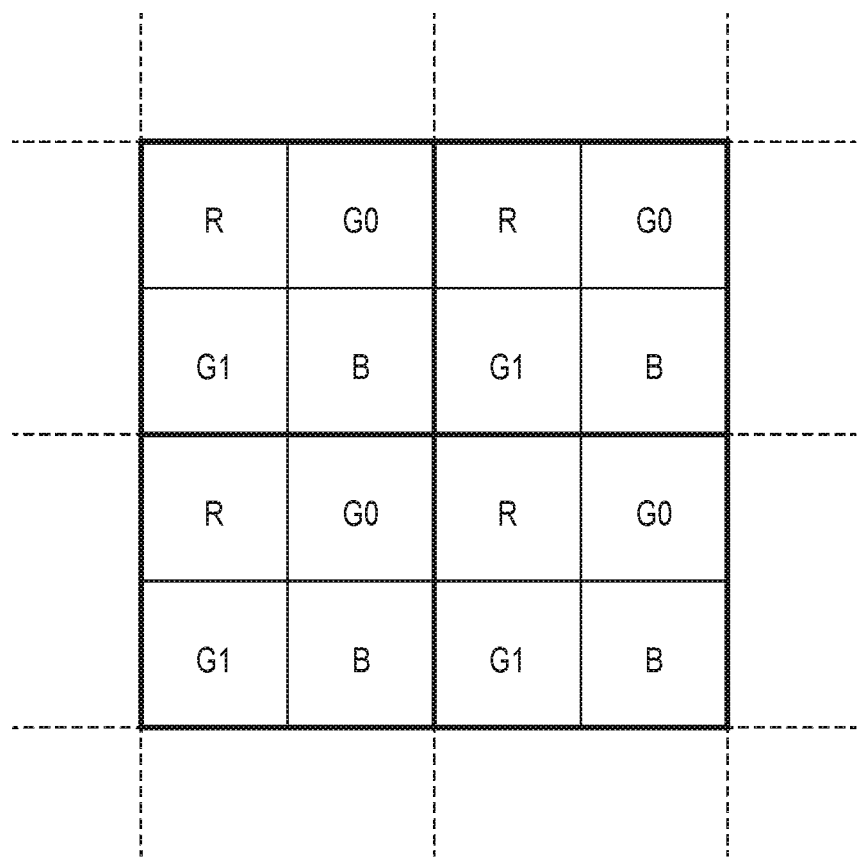
FIG. 2 is a diagram illustrating a Bayer array.

FIG. 1 is a block diagram illustrating the configuration of a RAW data encoding unit included in the image processing unit 1509. This RAW data encoding unit includes a determining unit 111 that determines a transforming method for the RAW data and an encoding unit 112 that executes an encoding process in accordance with the result of the determination made by the determining unit 111.

The determining unit 111 includes a frame memory 101, a first plane transforming unit 102, a second plane transforming unit 103, a plane determining unit 104, a color difference transforming unit 108, and a feature extracting unit 109. The RAW data input to the determining unit 111 in this embodiment is Bayer array image data as mentioned earlier.

The encoding unit 112 includes a wavelet transforming unit 105, a quantizing unit 106, an entropy encoding unit 107, a code amount controlling unit 110, and a code stream generating unit 113. The encoding unit 112 according to this embodiment encodes according to the JPEG 2000 standard, but the particular encoding method is of no consequence.

The foregoing has described the configuration of the RAW data encoding unit according to this embodiment. The RAW data encoding process will be described in further detail next, with reference to the aforementioned constituent elements.

The RAW data obtained from the A/D converter 1507 is held in the frame memory 101 in order based on the timing at which the data was captured. The plane determining unit 104 then determines whether to transform the RAW data held in the frame memory 101 into a first plane group or a second plane group (described later) on the basis of a result of processing performed by the feature extracting unit 109 (also described later). In response to the result of this determination, the plane determining unit 104 reads out the RAW data in the frame memory 101 at a predetermined encoding processing timing and supplies the data to the first plane transforming unit 102 or the second plane transforming unit 103. The determination process performed by the plane determining unit 104 will be described in detail later. The frame memory 101 thus functions as a buffer that stores and holds the RAW data until the timing at which the data is read out by the plane determining unit 104.

Figure 3:
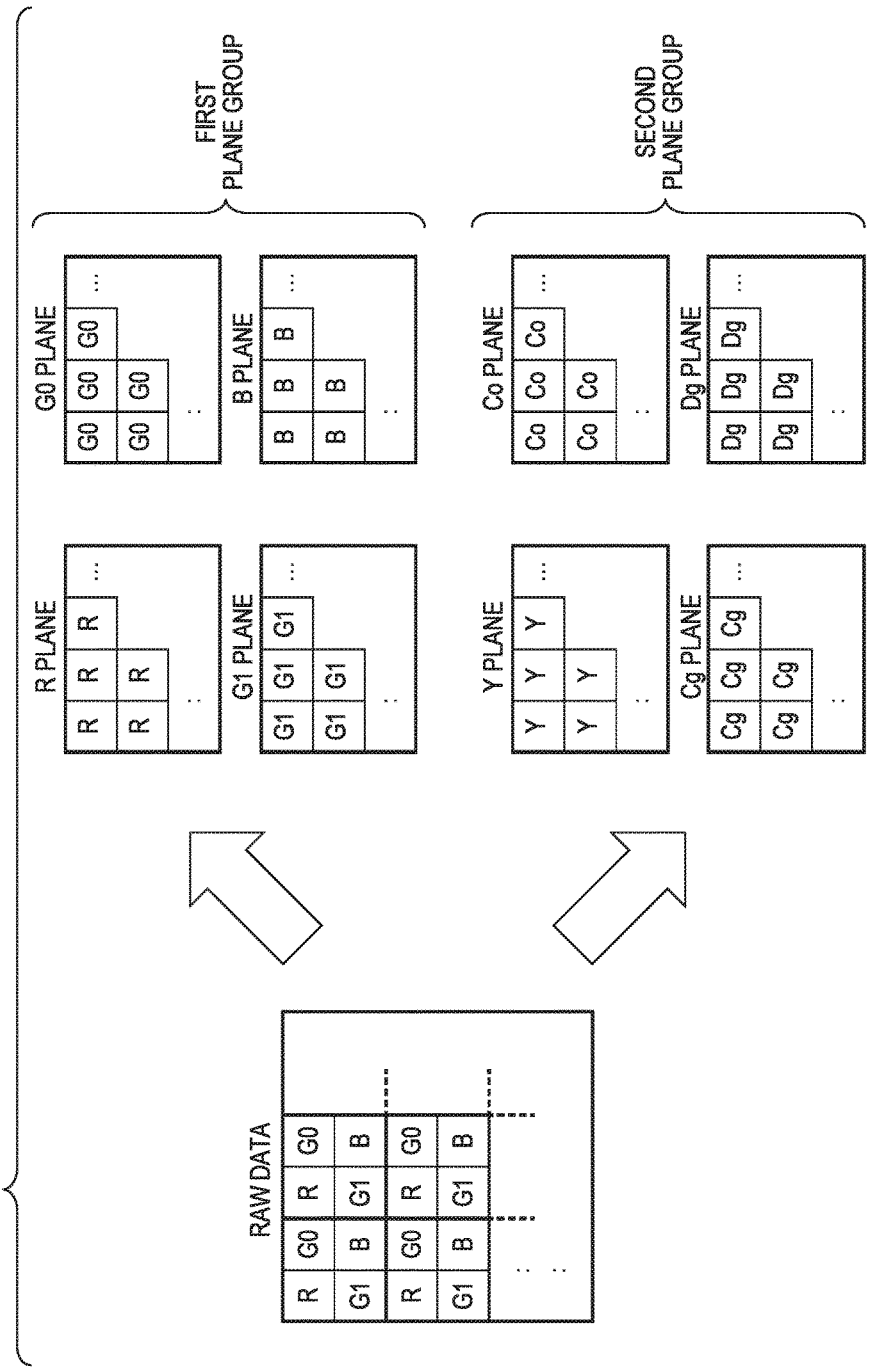
FIG. 3 is a diagram used to describe a first plane transforming unit and a second plane transforming unit.

The first plane transforming unit 102 and the second plane transforming unit 103 will be described next with reference to FIG. 3.

The first plane transforming unit 102 transforms the Bayer array RAW data into a total of four planes, namely an R plane constituted only of an R component, a G0 plane constituted only of a G0 component, a G1 plane constituted only of a G1 component, and a B plane constituted only of a B component. The first plane transforming unit 102 then supplies the R plane, the G0 plane, the G1 plane, and the B plane to the encoding unit 112 in that order. The "first plane group" mentioned earlier is a collective term for the R, G0, G1, and B planes mentioned here.

The second plane transforming unit 103 includes an internal buffer memory, and in accordance with Formula (1) indicated below, approximately transforms the R, G0, G1, and B values in the RAW data, which correspond to 2×2 pixels in the Bayer array, into a single luminance Y and three color differences Co, Cg, and Dg, which are then held in the buffer memory. The second plane transforming unit 103 applies this transforming process to all the pixels in the RAW data. As a result, a total of four planes are generated in the buffer memory of the second plane transforming unit 103, namely a Y plane constituted only of the luminance Y, a Co plane constituted only of the color difference Co, a Cg plane constituted only of the color difference Cg, and a Dg plane constituted only of the color difference Dg. The second plane transforming unit 103 then supplies the generated Y plane, Co plane, Cg plane, and Dg plane to the encoding unit 112 in that order. The "second plane group" mentioned earlier is a collective term for the Y, Co, Cg, and Dg planes mentioned here.

$$Y = \frac{R + G0 + G1 + B}{4} \quad (1)$$
$$Co = R - B$$
$$Cg = \frac{G0 + G1}{2} - \frac{R + B}{2}$$
$$Dg = G0 - G1$$

As described above, the determining unit 111 supplies the R, G0, G1, B, Y, Co, Cg, and Dg planes to the encoding unit 112 one at a time. However, the four planes supplied consecutively from the determining unit 111 to the encoding unit 112 are either {R, G0, G1, B} or {Y, Co, Cg, Dg}. The encoding unit 112 treats the planes that have been input as so-called monochromatic multi-valued image data, and encodes the planes as such. To simplify the descriptions, the individual pieces of data included in a given plane will be called "pixels" regardless of which plane is being discussed.

The processing of the encoding unit 112 according to the embodiment will be described next.

The wavelet transforming unit 105 generates a plurality of sub-bands by executing a wavelet transform process on a single plane (called a "plane of interest" hereinafter) from the determining unit 111. The wavelet transforming unit 105 then supplies the generated plurality of sub-bands to the quantizing unit 106.

Figure 4:
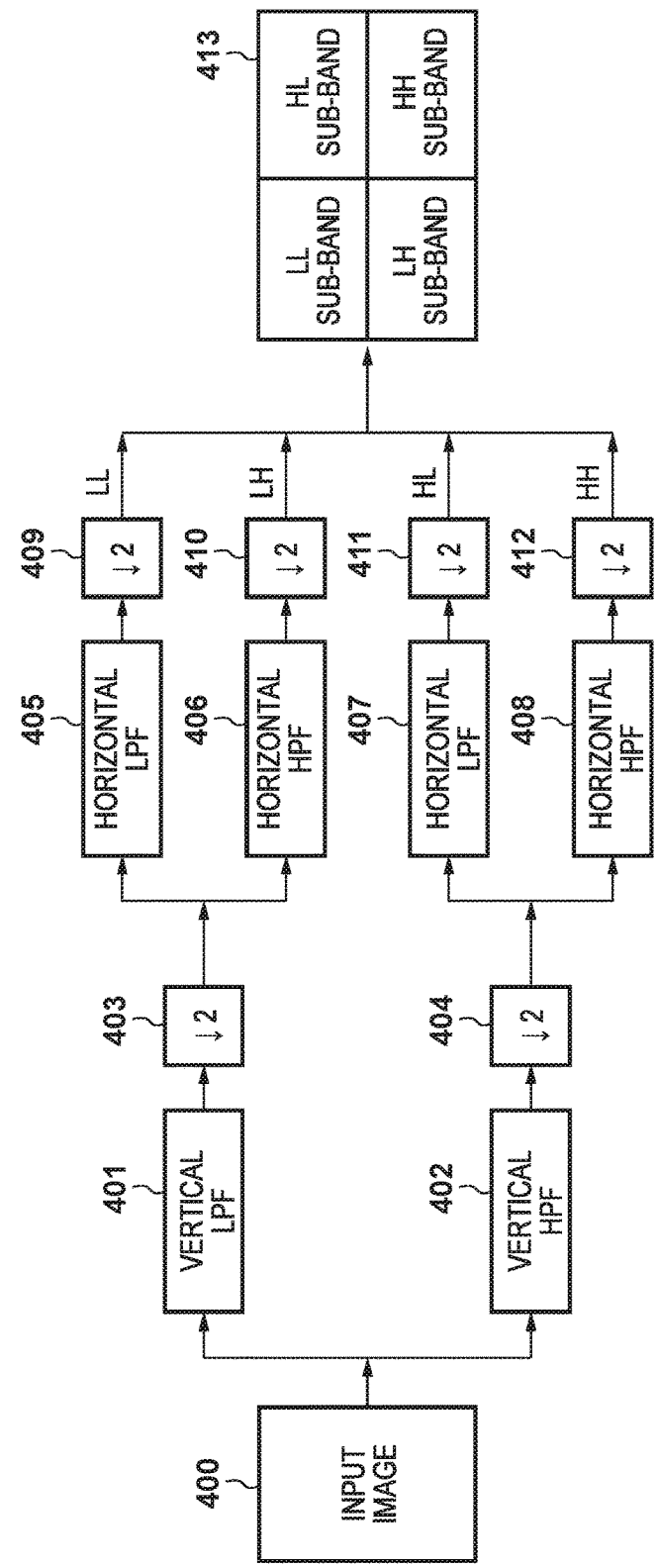
FIG. 4 is a block diagram illustrating a wavelet transform.

Here, FIG. 4 is a block diagram illustrating the processing performed by the wavelet transforming unit 105. FIG. 4 illustrates the same configuration as employed for JPEG 2000, and illustrates a configuration for carrying out a single wavelet transform. Reference numeral 400 in FIG. 4 indicates a single plane input from the determining unit 111, and is denoted as an "input image" for the sake of simplicity. The input image 400 is supplied to a vertical LPF (vertical low-pass filter) 401 and a vertical HPF (vertical high-pass filter) 402. The vertical LPF 401 allows a low-frequency component of the pixels in the input image 400 that are arranged in the vertical direction to pass. The vertical HPF 402 allows a high-frequency component of the pixels in the input image 400 that are arranged in the vertical direction to pass. The respective pieces of data extracted through the vertical LPF 401 and the vertical HPF 402 are then downsampled to 2:1 in the vertical direction by downsampling circuits 403 and 404. Low-frequency component data and high-frequency component data having ½ the resolution relative to the resolution of the input image 400 in the vertical direction are obtained as a result.

The vertical direction low-frequency component data obtained by the downsampling circuit 403 is supplied to a horizontal LPF 405 and a horizontal HPF 406. From the input data, the horizontal LPF 405 allows a low-frequency component arranged in the horizontal direction to pass. Likewise, from the input data, the horizontal HPF 406 allows a high-frequency component arranged in the horizontal direction to pass. The data obtained through the horizontal LPF 405 and the horizontal HPF 406 is downsampled to 2:1 in the horizontal direction by downsampling circuits 409 and 410. As a result, transform coefficient data expressing a sub-band LL having ½ the resolution of the input image 400 in both the horizontal and vertical directions is obtained from the downsampling circuit 409. Likewise, transform coefficient data expressing a sub-band LH having ½ the resolution of the input image 400 in both the horizontal and vertical directions is obtained from the downsampling circuit 410.

The vertical direction high-frequency component data obtained by the downsampling circuit 404 is supplied to a horizontal LPF 407 and a horizontal HPF 408. From the input data, the horizontal LPF 407 allows a low-frequency component arranged in the horizontal direction to pass. Likewise, from the input data, the horizontal HPF 408 allows a high-frequency component arranged in the horizontal direction to pass. The data obtained through the horizontal LPF 407 and the horizontal HPF 408 is downsampled to 2:1 in the horizontal direction by downsampling circuits 411 and 412. As a result, transform coefficient data expressing a sub-band HL having ½ the resolution of the input image 400 in both the horizontal and vertical directions is obtained from the downsampling circuit 411. Likewise, transform coefficient data expressing a sub-band HH having ½ the resolution of the input image 400 in both the horizontal and vertical directions is obtained from the downsampling circuit 412.

Reference numeral 413 in FIG. 4 indicates the sub-bands LL, HL, LH, and HH constituted by the transform coefficient data output from the downsampling circuits 409 to 412. Here, the sub-band LL is constituted by both horizontal and vertical low-frequency transform coefficient data of the input image 400, and can be considered a reduced image of the input image 400. Meanwhile, the transform coefficient data contained in the sub-bands HH, HL, and LH mostly have sufficiently low values, and thus can be expected to have a high encoding efficiency. The foregoing has described a case where a single wavelet transform is carried out. Second and subsequent wavelet transforms can be realized by recursively using the sub-band LL obtained through the immediately-previous transform as the input image 400.

The code amount controlling unit 110 determines a target code amount allocated to each frame and each plane in accordance with a compression rate set by the user through the operating unit 1504, and sets the determined target code amount in the quantizing unit 106. "Frame" as used here refers to a single RAW data image.

The quantizing unit 106 quantizes the transform coefficient data sent from the wavelet transforming unit 105 using quantizing parameters determined on the basis of the target code amount set by the code amount controlling unit 110. The quantizing unit 106 then supplies the quantized transform coefficient data to the entropy encoding unit 107. Note that a greater quantizing step is selected as the set target code amount decreases.

The entropy encoding unit 107 generates encoded data by carrying out entropy encoding such as EBCOT (Embedded Block Coding with Optimized Truncation), on a sub-band by sub-band basis, on the transform coefficient data quantized by the quantizing unit 106.

The code stream generating unit 113 includes an internal buffer memory. The code stream generating unit 113 also receives a control signal from the plane determining unit 104. This control signal is a signal expressing whether the RAW data from the frame memory 101 was supplied to the first plane transforming unit 102 or to the second plane transforming unit 103. In other words, this control signal indicates whether the encoded data being generated by the entropy encoding unit 107 is encoded data of a plane belonging to the first plane group {R, G0, G1, B} or encoded data of a plane belonging to the second plane group {Y, Co, Cg, Dg}. Upon four planes' worth of encoded data being accumulated in the internal buffer memory, the code stream generating unit 113 generates a header including identification information according to the control signal from the plane determining unit 104 and outputs the header to a write buffer allocated in the RAM 1503 in advance. The plane determining unit 104 then outputs the four planes' worth of encoded data continuing from that header to that write buffer in a predetermined order. Here, the identification information is information indicating whether the encoded data continuing from the header is the first plane group {R, Go, G1, B} or the second plane group {Y, Co, Cg, Dg}.

Note that each time a given amount of encoded data is held in the write buffer, the CPU 1501 controls the memory card I/F 1510 to record the data accumulated in the write buffer into the memory card 1511. However, the process of recording into the memory card 1511 is not of primary concern to the present invention, and thus details thereof will not be given.

Processing performed by the color difference transforming unit 108, the feature extracting unit 109, and the plane determining unit 104 in the determining unit 111 will be described next. The plane determining unit 104 determines whether the RAW data is to be supplied to the first plane transforming unit 102 or the second plane transforming unit 103 on the basis of data obtained through the color difference transforming unit 108 and the feature extracting unit 109. Note that the plane determining unit 104 outputs a signal produced when this determination is made to the code stream generating unit 113 as the control signal described above.

In the case where the RAW data is subjected to lossy encoding, the encoding of the second plane group {Y, Co, Cg, Dg} can be expected to have a higher compression rate than the encoding of the first plane group {R, G0, G1, B}. However, in the case where the latter encoding is employed, and a process such as strong color grading is applied to the corresponding decoded image, color noise unanticipated by the user may arise. On the other hand, in the case where the former encoding is employed, color noise will either not arise or will be low enough to be ignored even if a color grading process is applied.

Accordingly, in the present embodiment, it is assumed that the user possesses tools that enable image processing such as color grading to be carried out. RAW data having qualities in which color noise is likely to arise when such tools are used is transformed to the first plane group and then encoded. However, RAW data having qualities in which color noise is unlikely to arise is transformed to the second plane group and encoded, which increases the encoding efficiency. It is therefore necessary to determine or estimate whether or not the RAW data (called "RAW data of interest" hereinafter) has the aforementioned qualities. Processing involved in this determination will be described next.

The color difference transforming unit 108 calculates the color difference components Co, Cg, and Dg from the RAW data of interest, which will be held in the frame memory 101, according to the aforementioned Formula (1). The color difference transforming unit 108 accumulates the calculated color difference components Co, Cg, and Dg in a buffer memory (not shown) provided internally. The color difference component calculation being completed for all pixels in the RAW data of interest results in the Co, Cg, and Dg planes being held in the internal buffer. Note that although the data contained in Co, Cg, and Dg is color difference data as indicated in Formula (1), that data is expressed here as pixels, and the values thereof as pixel values, for the sake of simplicity.

The feature extracting unit 109 calculates variances VarCo, VarCg, and VarDg of the pixel values of the Co plane, the Cg plane, and the Dg plane generated by the color difference transforming unit 108, according to the following Formula (2). The feature extracting unit 109 then supplies the calculated variances VarCo, VarCg, and VarDg to the plane determining unit 104 as feature data of the RAW data of interest.

$$AveCo = \frac{\sum_{i=1}^{n} Co_i}{n}, \quad VarCo = \frac{\sum_{j=1}^{n} (Co_j - AveCo)^2}{n} \quad (2)$$

$$AveCg = \frac{\sum_{i=1}^{n} Cg_i}{n}, \quad VarCg = \frac{\sum_{j=1}^{n} (Cg_j - AveCg)^2}{n}$$

$$AveDg = \frac{\sum_{i=1}^{n} Dg_i}{n}, \quad VarDg = \frac{\sum_{j=1}^{n} (Dg_j - AveDg)^2}{n}$$

Note that in Formula (2), n represents a number of pixels in the data of each plane, and AveCo, AveCg, and AveDg represent the average values of the pixel values in the Co, Cg, and Dg planes, respectively.

The plane determining unit 104 determines whether to transform the RAW data of interest into the first plane group or the second plane group on the basis of VarCo, VarCg, and VarDg supplied from the feature extracting unit 109. In the case where it is determined that the RAW data of interest is to be transformed into the first plane group, the plane determining unit 104 supplies that RAW data of interest to the first plane transforming unit 102. Likewise, in the case where it is determined that the RAW data of interest is to be transformed into the second plane group, the plane determining unit 104 supplies that RAW data of interest to the second plane transforming unit 103.

Here, a threshold corresponding to the variance VarCo is defined as ThCo, a threshold corresponding to the variance VarCg as ThCg, and a threshold corresponding to the variance VarDg as ThDg. The plane determining unit 104 makes a conditional determination as to whether or not the following conditions are met. In the case where these conditions are met, the plane determining unit 104 determines that the RAW data of interest is not suited to transforming into the second plane group, and determines that the RAW data of interest is to be transformed into the first plane group {R, G0, G1, B}.

$Var_{Co} > ThCo$, or $Var_{Cg} > ThCg$, or $Var_{Dg} > ThDg$

On the other hand, in the case where these conditions are not met, the plane determining unit 104 determines that the RAW data of interest is to be transformed into the second plane group {Y, Co, Cg, Dg}. To rephrase, the plane determining unit 104 determines that encoding will be carried out using the second plane group when the following conditions are met.

$Var_{Co} \leq ThCo$, or $Var_{Cg} \leq ThCg$, or $Var_{Dg} \leq ThDg$

In a case such as this, where the color differences have high variances and the code amount and amplitude of the color differences will be higher when the data is encoded, the occurrence of color noise is suppressed by selecting to transform the data into the first plane group {R, G0, G1, B} and ensure uniform distortion among the respective color components. On the other hand, in cases where the variances of the color differences are sufficiently small and little color noise will arise, transforming the data into the second plane group {Y, Co, Cg, Dg} is selected. A greater amount of code is allocated to the Y plane as a result, which makes it possible to suppress the encoded data amount while maintaining high image quality.

FIG. 16A illustrates the structure of a moving picture data file written by the CPU 1501 into the memory card 1511 via the memory card I/F 1510 following the above-described encoding process. A file header holds information common among the frames at the time of decoding, such as the number of pixels in the RAW data in the horizontal and vertical directions, information indicating how many bits each pixel has, and so on. The plane header also holds information indicating whether the following planes are encoded data of the first plane group or encoded data of the second plane group.

According to the embodiment as described thus far, the color difference transforming unit 108 calculates the color differences Co, Cg, and Dg and generates the respective planes thereof. Accordingly, it is also possible for the second plane transforming unit 103 to generate only the Y plane and for the other Co, Cg, and Dg planes to reuse the planes generated by the color difference transforming unit 108.

In addition, when a moving picture is recorded using an image capturing apparatus, the angle of view normally does not vary significantly during the shooting. As such, the plane determining unit 104 may make the determination for the RAW data of the first frame of the moving picture, and then transform the RAW data of the second and subsequent frames into the plane group determined for the first frame. In this case, information indicating whether the first frame is transformed into the first plane group or the second plane group is held in the moving picture file header.

Although the embodiment has thus far described an example in which a moving picture is encoded, the embodiment may also be applied in cases where still images are recorded. The data structure of a still image data file in such a case is as illustrated in FIG. 16B. Whether the encoded data in a payload portion is encoded data of the first plane group or of the second plane group is held in the file header.

Additionally, although the embodiment uses the three variances of the color differences Co, Cg, and Dg as the feature data referenced by the plane determining unit 104, it is also possible to use only the variances of the color differences Co and Cg. This has an advantage in that the amount of computation for the Dg variance can be reduced. Dg also corresponds to a difference between G0 and G1, has a stronger quality as an edge in a diagonal direction of the G component than as a color difference, and has comparatively little effect on the occurrence of color noise, and therefore has little effect on the determination. Note that whether or not to use the Dg component as a factor in the determination may be made selectable by the user through the operating unit 1504.

In the above first embodiment, the plane determining unit 104 determines whether the RAW data is to be supplied to the first plane transforming unit 102 or the second plane transforming unit 103. In other words, the plane determining unit 104 determines which transforming unit to use.

As an alternative, the first plane transforming unit 102 and the second plane transforming unit 103 are each provided with a buffer memory. The first plane transforming unit 102 and the second plane transforming unit 103 then transform the same RAW data into the four planes simultaneously. The plane determining unit 104 may then supply the plane group generated by one of the transforming units to the encoding unit 112.

In the first embodiment described above, the color difference transforming unit 108 generates the planes for the color differences Co, Cg, and Dg. Accordingly, it is also possible for the second plane transforming unit 103 to generate only the luminance Y plane and use the color difference transforming unit 108 for the color differences Co, Cg, and Dg. Depending on the case, the color difference transforming unit 108 and the second plane transforming unit may be integrated as a single unit.

In the embodiment described above, the code amount controlling unit 110 adjusts a code amount generated by setting the target code amounts for each plane in the quantizing unit 106. However, the present invention is not limited thereto. In JPEG 2000, a transform coefficient obtained through quantization handles bitplanes formed at the same bit position as binary data, and the entropy encoding unit (arithmetic encoding) 107 carries out the encoding in units of bitplanes. Assume that encoded data of a bitplane of a bit i in a plane of a given color component of interest is represented by Ci, and the code amount thereof is represented by A(Ci). A total code amount C_total of the encoded data thus becomes:

C_total=ΣA(Ci) (where i=0,1,2 ... MSB)

Thus if the target code amount of the plane of the color component of interest is taken as A_Target, a minimum value for k that satisfies the following formula is found.

C_Target≥C_total−ΣA(Ck)

The encoded data of bitplanes from bit 0 to bit k may then be discarded. Although the following embodiments also describe adjusting the code amount using quantizing parameters in the same manner as the first embodiment described above, the code amount may be adjusted by using the advantages of employing JPEG 2000 and carrying out the process for discarding bitplanes.

Variation on First Embodiment

An example in which the processing described above in the first embodiment is implemented by an application program run on a generic information processing apparatus such as a personal computer will be described next as a variation on the first embodiment.

Figure 17:
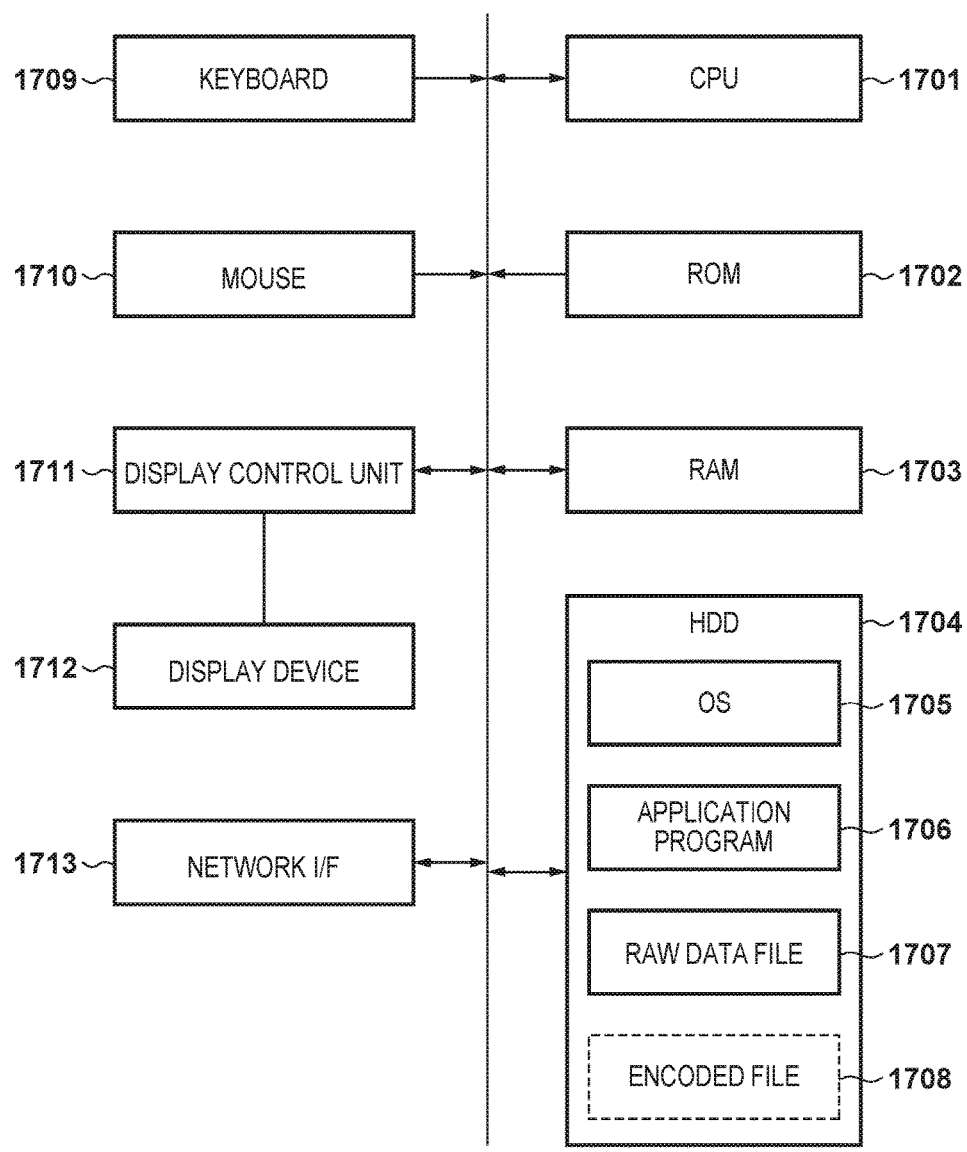
FIG. 17 is a block diagram illustrating an information processing apparatus to which an embodiment has been applied.

FIG. 17 is a block diagram illustrating an information processing apparatus according to the present variation. When the apparatus is turned on, a CPU 1701 commences processing according to a boot program stored in a ROM 1702, and loads an OS (operating system) 1705 into a RAM 1703 from an HDD (hard disk drive) 1704. As a result, upon receiving an instruction from a user through a keyboard 1709 or a mouse 1710, the CPU 1701 can control a display control unit 1711 to display a menu and the like in a display device 1712. In other words, the apparatus functions as an information processing apparatus used by the user. When the user then uses the mouse 1710 or the like to instruct an application program 1706 to be launched, the CPU 1701 loads the application program 1706 into the RAM 1703 and runs the program. The apparatus functions as an image encoding apparatus as a result.

Figure 5:
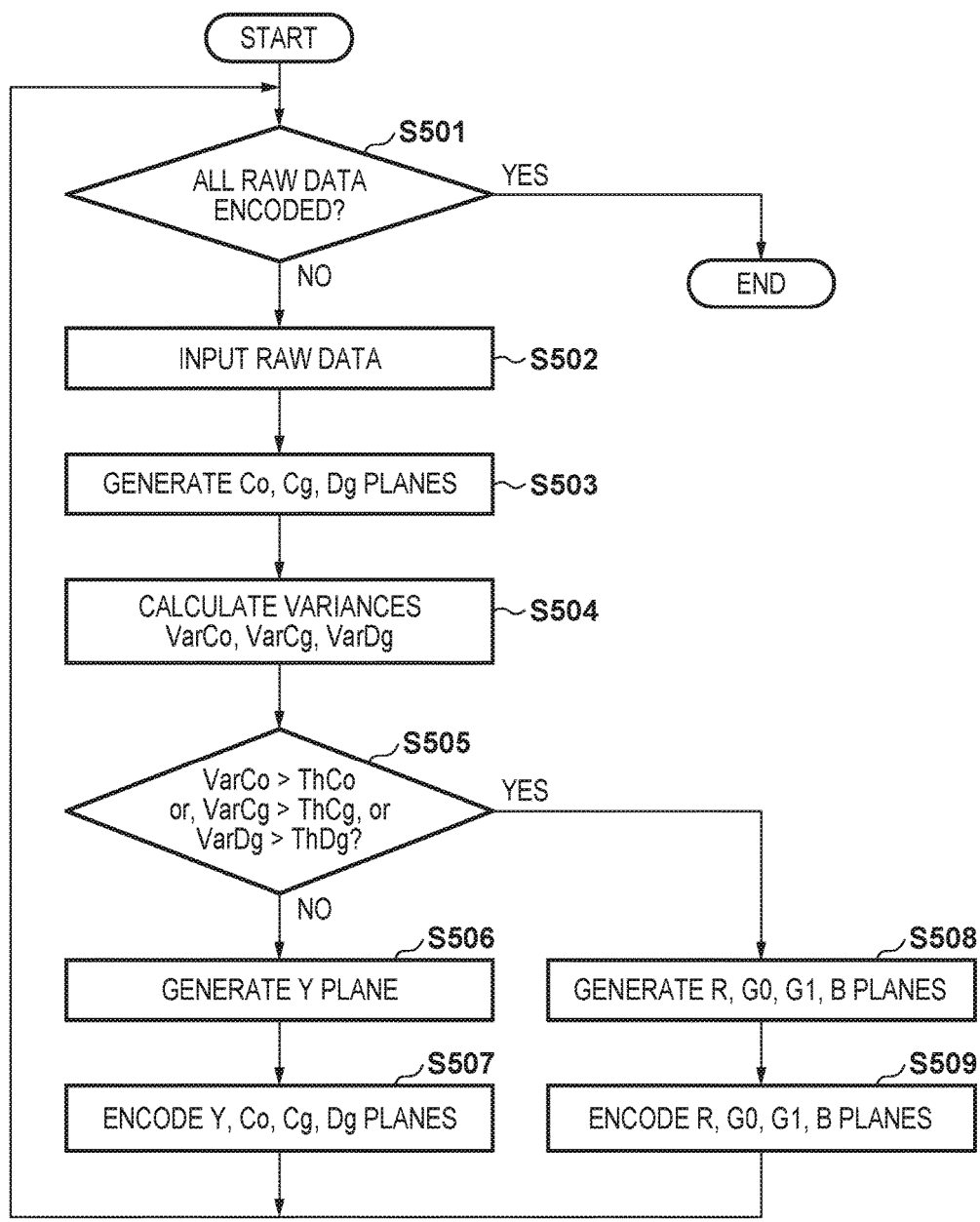
FIG. 5 is a flowchart illustrating an encoding process according to a variation on the first embodiment.

FIG. 5 is a flowchart illustrating a sequence of processing performed by the CPU 1701 when the application program 1706 is run. The following will describe an example in which unencoded RAW data contained in a RAW data file 1707 stored in the HDD 1704 is encoded so as to generate an encoded file 1708. The encoding result may be output to network-attached storage rather than to the HDD 1704. In this case, the encoded data is sent via a network interface 1713.

First, in step S501, the CPU 1701 determines whether or not the encoding process is complete for all of the RAW data in the RAW data file 1707. In the case where the encoding process is not complete, in step S502, the CPU 1701 inputs a single frame's worth of RAW data from the RAW data file 1707 and holds that data in the RAM 1703. Then, in step S503, the CPU 1701 calculates the color differences Co, Cg, and Dg through Formula (1) by referring to the RAW data held in the RAM 1703. The CPU 1701 holds the calculated color differences Co, Cg, and Dg in respective storage regions for the Co, Cg, and Dg planes allocated in the RAM 1703. The Co, Cg, and Dg planes are stored in the RAM 1703 by executing this process for all of the pixels in the RAW data. In step S504, the CPU 1701 calculates the variances VarCo, VarCg, and VarDg for the respective planes. This calculation is as indicated by Formula (2).

Next, in step S505, the CPU 1701 determines whether or not the following conditions are met.

Var*Co*>Th*Co*, or

Var*Cg*>Th*Cg*, or

Var*Dg*>Th*Dg*

In the case where these conditions are not met, the CPU 1701 determines that the RAW data of interest is to be encoded after being transformed into the second plane group {Y, Co, Cg, Dg}. The Co, Cg, and Dg planes are already generated in the RAM 1703. Accordingly, in step S506, the CPU 1701 transforms the data into the Y plane only, and stores the obtained Y plane in the RAM 1703. Then, in step S507, the CPU 1701 adds, to the encoded file 1708, a plane header including identification information indicating that the file is encoded data of the {Y, Co, Cg, Dg} planes. The CPU 1701 then handles the respective planes in the second plane group {Y, Co, Cg, Dg} as monochromatic multi-valued images, encodes the planes in order according to JPEG 2000, and adds the encoded data to the encoded file 1708. Since the encoding process in JPEG 2000 is commonly known, descriptions thereof will not be given here.

On the other hand, in the case where the conditions described above are met, the CPU 1701 determines that the RAW data of interest is to be encoded after being transformed into the first plane group {R, G0, G1, B}. Accordingly, in step S508, the CPU 1701 generates the respective planes of the first plane group {R, G0, G1, B} from the RAW data of interest in the RAM. Then, in step S509, the CPU 1701 adds, to the encoded file 1708, a plane header including identification information indicating that the data is encoded data of the first plane group {R, G0, G1, B}. The CPU 1701 then handles the respective planes in the first plane group {R, G0, G1, B} as monochromatic multi-valued images, encodes the planes in order according to JPEG 2000, and adds the encoded data to the encoded file 1708.

As described thus far, a RAW image encoded file providing the same effects as described in the first embodiment can also be generated by causing a computer to run a computer program. It should be noted that "VarDg>ThDg" may be excluded from the conditions in step S505 as in the first embodiment.

Second Embodiment

Figure 6:
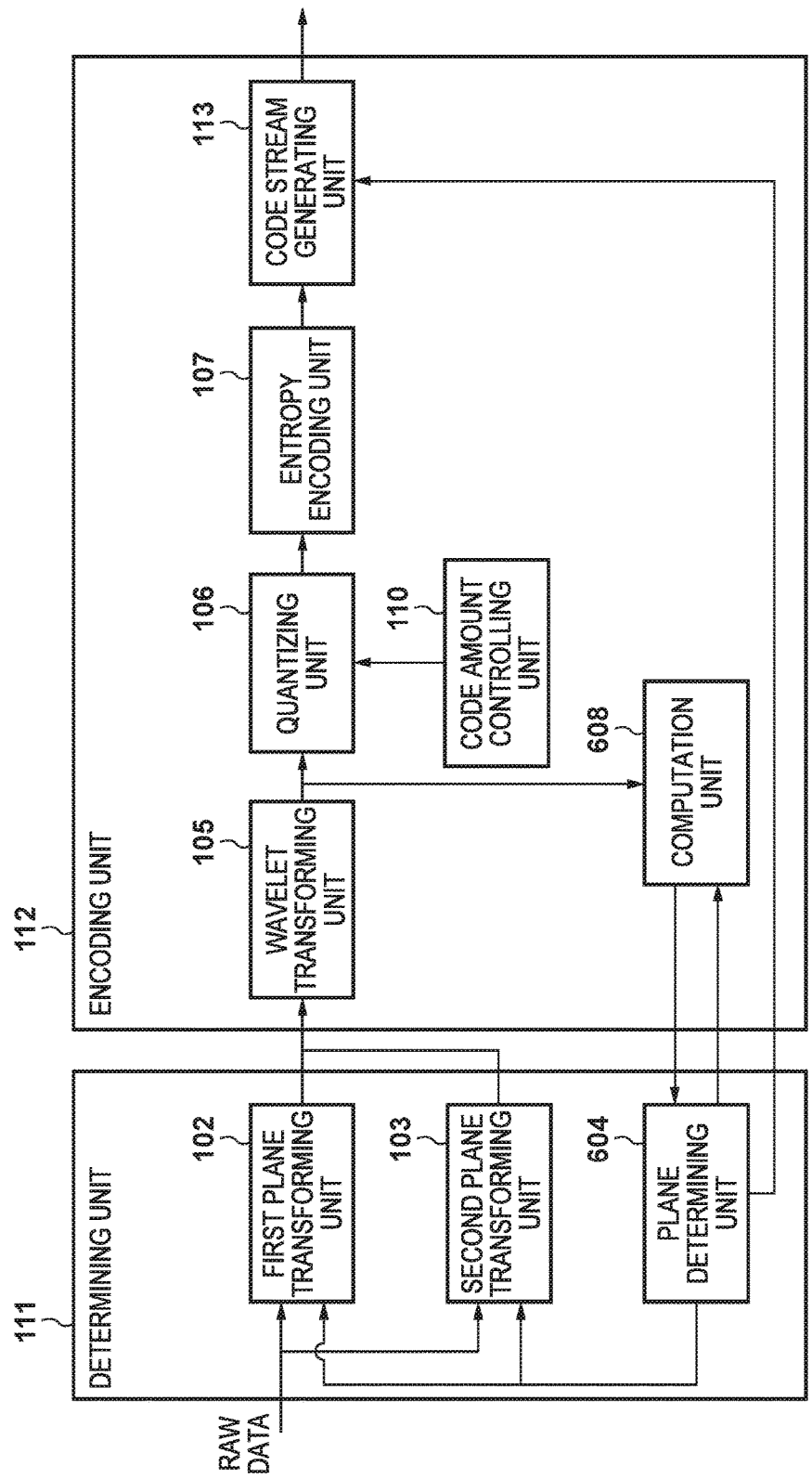
FIG. 6 is a block diagram illustrating a RAW data encoding unit according to a second embodiment.

A second embodiment will be described next. Like the first embodiment, the present second embodiment describes an example in which the invention is applied in an image capturing apparatus. The configuration of the image capturing apparatus is the same as in the first embodiment, as indicated in FIG. 15. Thus the present second embodiment will also describe a RAW data encoding unit in the image processing unit 1509. FIG. 6 is a block diagram illustrating the RAW data encoding unit according to the second embodiment.

The RAW data encoding unit according to the second embodiment has almost the same configuration as in the first embodiment. However, the frame memory 101, the color difference transforming unit 108, and the feature extracting unit 109 present in the first embodiment have been removed.

In their place, the second embodiment adds a computation unit 608. The second embodiment will also describe an example in which a moving picture constituted of RAW data and input in time series is encoded. In FIG. 6, elements given the same reference numerals as in FIG. 1 are assumed to have the same functions, and thus descriptions thereof will not be given.

Processing performed by a plane determining unit 604 according to the second embodiment will be described next according to the flowchart in FIG. 7, along with functions of the computation unit 608.

Upon the start of moving picture recording being instructed through the operating unit 1504, the plane determining unit 604 determines whether or not the input RAW data is the first frame of the moving picture recording (step S701). In the case where it is determined that the data is the first frame, the input RAW data is supplied to the second plane transforming unit 103 (step S702). As a result, the second plane transforming unit 103 generates the respective planes of the second plane group {Y, Co, Cg, Dg} from the RAW data. The plane determining unit 604 also supplies a control signal indicating that the second plane group has been selected to the code stream generating unit 113 at this time. The plane determining unit 604 then outputs a control signal for activating the computation unit 608 (step S703).

As a result of the foregoing, with respect to the first RAW data of the moving picture, the planes of the second plane group {Y, Co, Cg, Dg} are provided in order from the determining unit 111 to the encoding unit 112. The wavelet transforming unit 105 carries out wavelet transforms on the Y plane, the Co plane, the Cg plane, and the Dg plane in that order, and supplies coefficient data of the sub-bands LL, HL, LH, and HH to the quantizing unit 106 on a plane-by-plane basis. The encoding process that follows thereafter is the same as that described in the first embodiment.

As described earlier, when encoding the first RAW data of the moving picture, the computation unit 608 is activated. With the exception of the Y plane in the first RAW data of the recorded moving picture, the computation unit 608 performs computations using the transform coefficient data of the sub-bands obtained from the wavelet transforms on the Co plane, the Cg plane, and the Dg plane. FIG. 8 illustrates the sub-bands obtained from the wavelet transforms on the Co plane, the Cg plane, and the Dg plane. The computation unit 608 performs cumulating addition on the absolute values of the transform coefficient data of the sub-bands HL, LH, and HH, which contain a high-frequency component, obtained from the wavelet transform on the Co plane, calculating an absolute value sum Wh_sumCo. The computation unit 608 also calculates a sum of the absolute values of the transform coefficient data of the sub-bands HL, LH, and HH, which contain a high-frequency component, obtained from the wavelet transform on the Cg plane, as Wh_sumCg. The computation unit 608 furthermore calculates a sum of the absolute values of the transform coefficient data of the sub-bands HL, LH, and HH, which contain a high-frequency component, obtained from the wavelet transform on the Dg plane, as Wh_sumDg. These absolute value sums Wh_sumCo, Wh_sumCg, and Wh_sumDg are used as parameters for determining whether to convert the second and subsequent RAW data after the start of the moving picture recording into the first plane group {R, G0, G1, B} or into the second plane group {Y, Co, Cg, Dg}. Accordingly, the computation unit 608 supplies the calculated absolute value sums Wh_sumCo, Wh_sumCg, and Wh_sumDg to the plane determining unit 604.

Figure 7:
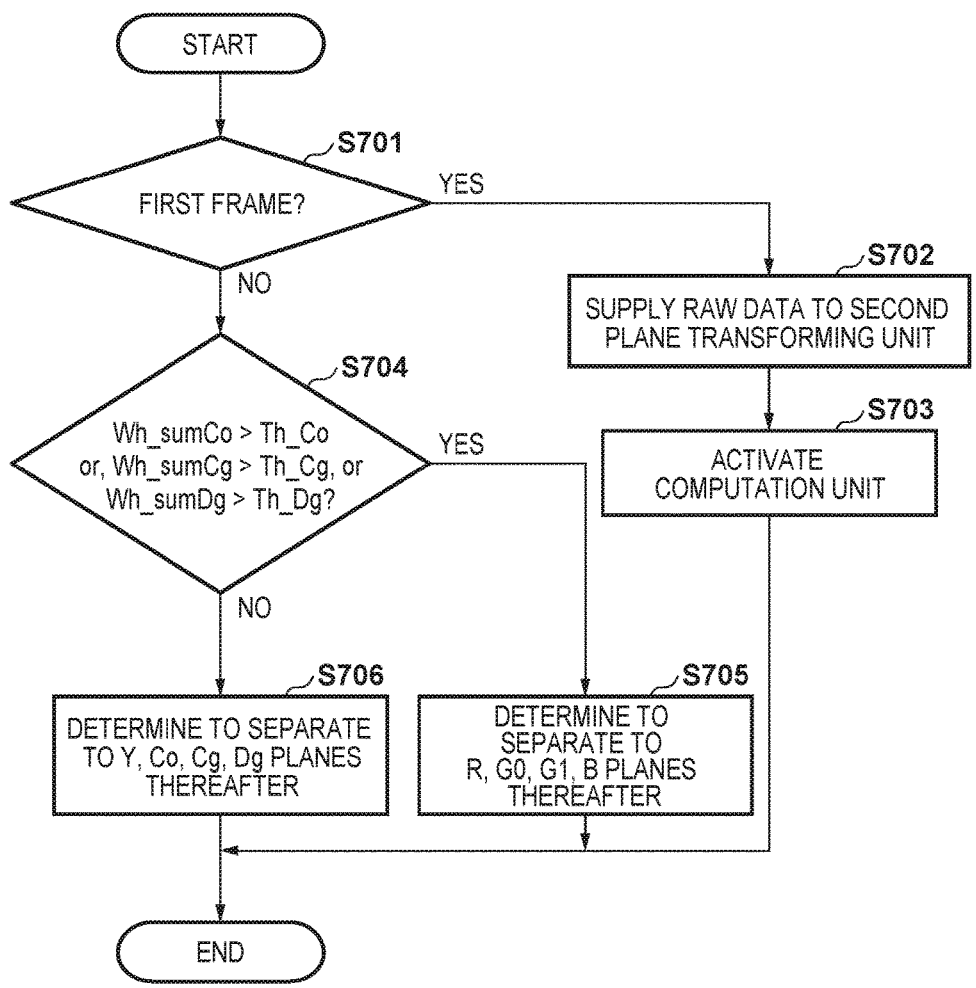
FIG. 7 is a flowchart illustrating a sequence of processing performed by a plane determining unit according to the second embodiment.

The descriptions will now return to the flowchart in FIG. 7. In the case where the plane determining unit 604 determines that the input RAW data is from the second or subsequent frame after the start of the moving picture recording, the process advances to step S704. In step S704, the transforming method for the RAW data of the second and subsequent frames is determined by referring to the absolute value sums Wh_sumCo, Wh_sumCg, and Wh_sumDg supplied from the computation unit 608.

Specifically, the plane determining unit 604 uses thresholds ThwhCo, ThwhCg, and ThwhDg prepared in advance for each color difference to determine whether or not the following conditions are met.

$Wh\_sumCo > ThwhCo$, or $Wh\_sumCg > ThwhCg$, or $Wh\_sumDg > ThwhDg$

In the case where the above conditions are met, the plane determining unit 604 sets the RAW data of the second and subsequent frames to undergo the transforming process by the first plane transforming unit 102 (step S705). As a result, with respect to the second and subsequent pieces of RAW data, the first plane group {R, G0, G1, B} generated by the first plane transforming unit 102 is encoded according to JPEG 2000 until the moving picture recording ends.

On the other hand, in the case where the above conditions are not met, the plane determining unit 604 sets the RAW data of the second and subsequent frames to undergo the transforming process by the second plane transforming unit 103 (step S706). As a result, with respect to the second and subsequent pieces of RAW data, the second plane group {Y, Co, Cg, Dg} generated by the second plane transforming unit 103 is encoded according to JPEG 2000 until the moving picture recording ends.

The computation unit 608 need not function in the process of encoding the second and subsequent frames. Accordingly, in the case where the aforementioned absolute value sums have been obtained from the computation unit 608, the plane determining unit 604 may deactivate the computation unit 608.

It is highly likely that color noise will arise in the case where the transform coefficients of the sub-bands containing a high-frequency component are high in the wavelet transforms of the respective planes of the color differences Co, Cg, and Dg. Thus as mentioned above, encoded data that suppresses the occurrence of color noise can be generated by transforming RAW data in which color noise is likely to arise into the first plane group {R, G0, G1, B}. Conversely speaking, in the case where color noise cannot arise or can be ignored, the encoding efficiency can be increased while increasing the resolution by transforming the RAW data into the second plane group {Y, Co, Cg, Dg}.

Unlike the first embodiment described above, in the second embodiment, the transforming method is determined using features of the RAW data in the first frame when the start of recording is instructed. It is thus possible that the determination of the transforming method will gradually become less accurate as time passes. However, a frame memory is not required, and fewer memory accesses are made than in the first embodiment, which makes it easy to implement the processing in real time even for high-framerate moving pictures.

According to the second embodiment, the first frame in the moving picture recording is transformed into the second plane group {Y, Co, Cg, Dg} and encoded, whereas a method of classification according to the conditions mentioned earlier is employed for the second to final frames of the moving picture recording. However, the RAW data may be reevaluated every predetermined interval of time. In this case, the plane determining unit 104 may activate the computation unit 608 and carry out the aforementioned determination process each time the predetermined amount of time passes. As a result, even if the user makes pan, tilt, zoom, or similar operations and the subject changes while the moving picture is being recorded, the method for transforming into the plane groups can be determined in response to the changes in the subject. Note that the encoding process according to the second embodiment may be implemented by a computer program in the same manner as in the variation on the first embodiment described above.

Third Embodiment

A third embodiment will be described next. Like the first embodiment, the present third embodiment describes an example in which the invention is applied in an image capturing apparatus. The configuration of the RAW data encoding unit according to the third embodiment is the same as that described in the second embodiment with reference to FIG. 6. However, the determination process performed by the plane determining unit 604 and the computation process performed by the computation unit 608 in the present third embodiment differ from those of the second embodiment. Additionally, the wavelet transforming unit 105 according to the present third embodiment carries out two wavelet transforms on each plane that is input.

Processing performed by the plane determining unit 604 according to the third embodiment will be described next according to the flowchart in FIG. 9, along with differences from the second embodiment.

Upon the start of moving picture recording being instructed through the operating unit 1504, the RAW data is supplied to the determining unit 111. The plane determining unit 604 in the determining unit 111 determines whether or not the input RAW data is the first frame of the moving picture recording (step S901). In the case where it is determined that the data is the first frame, the input RAW data is supplied to the second plane transforming unit 103, and the respective planes of the second plane group {Y, Co, Cg, Dg} are generated (step S902). The plane determining unit 604 also supplies a control signal indicating that the second plane group has been selected to the code stream generating unit 113 at this time. The plane determining unit 604 then outputs a control signal for activating the computation unit 608 (step S903).

As mentioned earlier, the wavelet transforming unit 105 executes two wavelet transforms on the plane of interest (the R, G0, G1, B, Y, Co, Cg, or Dg plane). By executing two wavelet transforms, a total of seven sub-bands, namely LL2, HL2, LH2, HH2, HL1, LH1, and HH1, are generated from a single frame. Aside from the number of sub-bands increasing, the processing performed by the quantizing unit 106, the entropy encoding unit 107, and the code stream generating unit 113 to generate the encoded data is the same as in the second embodiment and thus will not be described here.

The computation unit 608 according to the present third embodiment computes the sub-bands containing a high-frequency component, that is, with the exception of the LL sub-band, for each of the Co, Cg, and Dg planes obtained from the RAW data of the first frame.

FIG. 10 illustrates the sub-bands following the wavelet transforms on the Co plane, the Cg plane, and the Dg plane in the case where two wavelet transforms have been executed. Note that the numbers following the L and H indicate hierarchical levels. Thus "LL2", for example, indicates a sub-band of a hierarchical level 2 in a low-frequency region in both the horizontal direction and the vertical direction.

As illustrated in FIG. 10, when encoding the RAW data of the first frame following the start of moving picture recording, the computation unit 608 computes absolute value sums for the transform coefficient data of the sub-bands HL2, LH2, HH2, HL1, LH1, and HH1, aside from the sub-band LL2, for each color difference plane.

Here, the absolute value sum of the transform coefficient data in the sub-band HH1 of the hierarchical level 1 of the Co plane is represented by Wh_sumCoHH1. The absolute value sum of the transform coefficient data in the sub-band HL1 of the hierarchical level 1 of the Co plane is represented by Wh_sumCoHL1. The absolute value sum of the transform coefficient data in the sub-band LH1 of the hierarchical level 1 of the Co plane is represented by Wh_sumCoLH1. The absolute value sum of the transform coefficient data in the sub-band HH2 of the hierarchical level 2 of the Co plane is represented by Wh_sumCoHH2. The absolute value sum of the transform coefficient data in the sub-band HL2 of the hierarchical level 2 of the Co plane is represented by Wh_sumCoHL2. The absolute value sum of the transform coefficient data in the sub-band LH2 of the hierarchical level 2 of the Co plane is represented by Wh_sumCoLH2.

Likewise, the absolute value sum of the transform coefficient data in the sub-band HH1 of the hierarchical level 1 of the Cg plane is represented by Wh_sumCgHH1. The absolute value sum of the transform coefficient data in the sub-band HL1 of the hierarchical level 1 of the Cg plane is represented by Wh_sumCgHL1. The absolute value sum of the transform coefficient data in the sub-band LH1 of the hierarchical level 1 of the Cg plane is represented by Wh_sumCgLH1. The absolute value sum of the transform coefficient data in the sub-band HH2 of the hierarchical level 2 of the Cg plane is represented by Wh_sumCgHH2. The absolute value sum of the transform coefficient data in the sub-band HL2 of the hierarchical level 2 of the Cg plane is represented by Wh_sumCgHL2. The absolute value sum of the transform coefficient data in the sub-band LH2 of the hierarchical level 2 of the Cg plane is represented by Wh_sumCgLH2.

Likewise, the absolute value sum of the transform coefficient data in the sub-band HH1 of the hierarchical level 1 of the Dg plane is represented by Wh_sumDgHH1. The absolute value sum of the transform coefficient data in the sub-band HL1 of the hierarchical level 1 of the Dg plane is represented by Wh_sumDgHL1. The absolute value sum of the transform coefficient data in the sub-band LH1 of the hierarchical level 1 of the Dg plane is represented by Wh_sumDgLH1. The absolute value sum of the transform coefficient data in the sub-band HH2 of the hierarchical level 2 of the Dg plane is represented by Wh_sumDgHH2. The absolute value sum of the transform coefficient data in the sub-band HL2 of the hierarchical level 2 of the Dg plane is represented by Wh_sumDgHL2. The absolute value sum of the transform coefficient data in the sub-band LH2 of the hierarchical level 2 of the Dg plane is represented by Wh_sumDgLH2.

Figure 9:
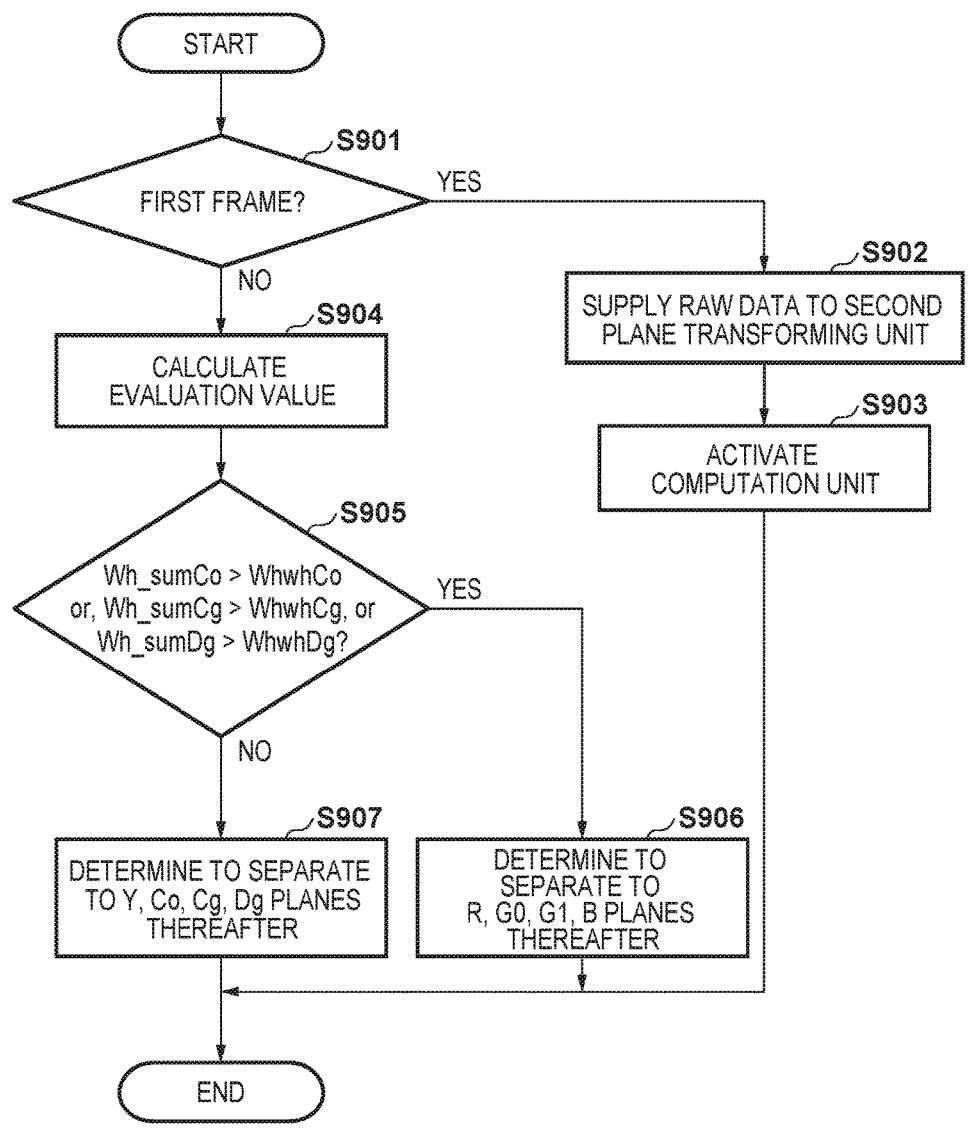
FIG. 9 is a flowchart illustrating a sequence of processing performed by a plane determining unit according to a third embodiment.

The descriptions will now return to the flowchart in FIG. 9. In the case where the plane determining unit 604 determines that the input RAW data is from the second or subsequent frame after the start of the moving picture recording, the process advances to step S904. In step S904, the plane determining unit 604 refers to the absolute value sums of the sub-bands calculated by the computation unit 608 when the first frame was encoded (see FIG. 10). The plane determining unit 604 then calculates evaluation values Wh_sumCo, Wh_sumCg, and Wh_sumDg for each color difference through the following Formula (3).

$$Wh\_sumCo = \alpha 1 \times Wh\_sumCoHH1 + \beta 1 \times Wh\_sumCoHL1 + \gamma 1 \times Wh\_sumCoLH1 + \alpha 2 \times Wh\_sumCoHH2 + \beta 2 \times Wh\_sumCoHL2 + \gamma 2 \times Wh\_sumCoLH2$$

$$Wh\_sumCg = a1 \times Wh\_sumCgHH1 + b1 \times Wh\_sumCgHL1 + c1 \times Wh\_sumCgLH1 + a2 \times Wh\_sumCgHH2 + b2 \times Wh\_sumCgHL2 + c2 \times Wh\_sumCgLH2$$

$$Wh\_sumDg = x1 \times Wh\_sumDgHH1 + y1 \times Wh\_sumDgHL1 + z1 \times Wh\_sumDgLH1 + x2 \times Wh\_sumDgHH2 + y2 \times Wh\_sumDgHL2 + z2 \times Wh\_sumDgLH2 \qquad (3)$$

In this Formula, $\alpha 1$, $\alpha 2$, $\beta 1$, $\beta 2$, $\gamma 1$, $\gamma 2$, a1, a2, b1, b2, c1, c2, x1, x2, y1, y2, z1, and z2 are weighting coefficients set in advance. The relationships of these weighting coefficients are as follows.

$$\alpha 1 < \beta 1 \approx \gamma 1, \alpha 2 < \beta 2 \approx \gamma 2, \alpha 1 < \alpha 2, \beta 1 < \beta 2, \gamma 1 < \gamma 2;$$

$$a1 < b1 \approx c1, a2 < b2 \approx c2, a1 < a2, b1 < b2, c1 < c2; \text{ and}$$

$$x1 < y1 \approx z1, x2 < y2 \approx z2, x1 < x2, y1 < y2, z1 < z2$$

As indicated above, the weighting coefficients for the sub-bands HL and LH are greater than those for the sub-band HH. This is because the sub-bands HL and LH strongly reflect qualities of a vertical edge and a horizontal edge, and are thus more prone not merely to color noise but to an overall drop in visual image quality. Likewise, lower hierarchical levels are given lower weights because carrying out quantization at higher hierarchical levels makes not merely color noise but also an overall drop in image quality more apparent.

Once the evaluation values Wh_sumCo, Wh_sumCg, and Wh_sumDg have been computed, the plane determining unit 604 advances the processing to step S905. In step S905, the plane determining unit 604 determines whether or not the following conditions are met using thresholds ThwhCo, ThwhCg, and ThwhDg set in advance for the respective evaluation values (step S905).

$$Wh\_sumCo > WhwhCo, \text{ or}$$

$$Wh\_sumCg > WhwhCg, \text{ or}$$

$$Wh\_sumDg > ThwhDg$$

In the case where the above conditions are met, the plane determining unit 604 sets the RAW data of the second and subsequent frames to undergo the transforming process by the first plane transforming unit 102 (step S906). As a result, with respect to the RAW data of the second and subsequent frames, the first plane group {R, G0, G1, B} generated by the first plane transforming unit 102 is encoded according to JPEG 2000 until the moving picture recording ends.

On the other hand, in the case where the above conditions are not met, the plane determining unit 604 sets the RAW data of the second and subsequent frames to undergo the transforming process by the second plane transforming unit 103 (step S907). As a result, with respect to the second and subsequent pieces of RAW data, the second plane group {Y, Co, Cg, Dg} generated by the second plane transforming unit 103 is encoded according to JPEG 2000 until the moving picture recording ends.

In this manner, weighting the wavelet coefficient absolute value sums according to the hierarchical level and frequency region makes it possible to determine whether to transform the RAW data into the first plane group or the second plane group more accurately.

Additionally, according to the third embodiment, the first frame in the moving picture recording is transformed into the second plane group {Y, Co, Cg, Dg} and encoded, whereas a method of classification according to the conditions mentioned earlier is employed for the second and subsequent to the final frames of the moving picture recording. However, the RAW data may be reevaluated every predetermined interval of time, as described in the second embodiment. In this case, the plane determining unit 104 may activate the computation unit 608 and carry out the aforementioned determination process each time the predetermined amount of time passes. As a result, even if the user makes pan or tilt operations and the subject changes while the moving picture is being recorded, the method for transforming into the plane groups can be determined in response to the changes in the subject.

Although the foregoing describes an example in which two wavelet transforms are carried out, any number of wavelet transforms, such as three, may be carried out. Additionally, the encoding process according to the third embodiment may be implemented by a computer program in the same manner as in the variation on the first embodiment described above.

Fourth Embodiment

A fourth embodiment will now be described. Like the first embodiment, the present fourth embodiment describes an example in which the invention is applied in an image capturing apparatus. The configuration of the image capturing apparatus is the same as in the first embodiment, as indicated in FIG. 15. Thus the present fourth embodiment will also describe a RAW data encoding unit in the image processing unit 1509.

Figure 11:
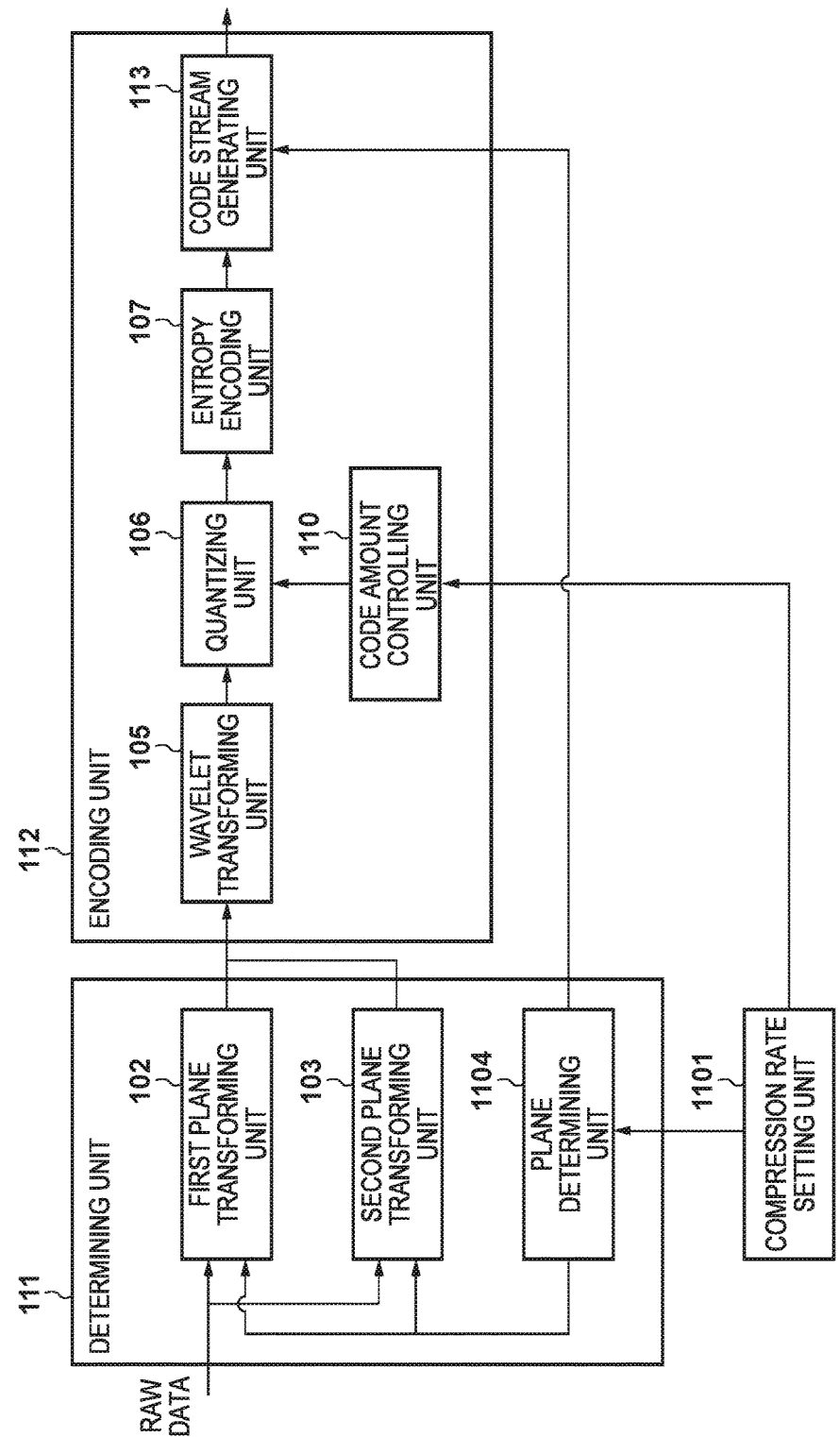
FIG. 11 is a block diagram illustrating a RAW data encoding unit according to a fourth embodiment.

FIG. 11 is a block diagram illustrating the RAW data encoding unit according to the fourth embodiment. The present fourth embodiment differs from the second embodiment described above in terms of the details of the processing performed by a plane determining unit 1104, and in that a compression rate setting unit 1101 is provided.

The compression rate setting unit 1101 sends a RAW data compression rate instructed by the user through the operating unit 1504 to the plane determining unit 1104 and the code amount controlling unit 110. Processing performed by the plane determining unit 1104 according to the present fourth embodiment will be described next according to the flowchart in FIG. 12.

Upon receiving an instruction to start moving picture recording, in step S1202, the plane determining unit 1104 compares a compression rate set by the compression rate setting unit 1101 with a pre-set threshold. The compression rate being higher than the threshold indicates that the user wishes to reduce the size of the encoded data file. Accordingly, the plane determining unit 1104 sets the RAW data to undergo the transforming process by the second plane transforming unit 103 (step S1203). As a result, the second plane group {Y, Co, Cg, Dg} generated by the second plane transforming unit 103 is encoded according to JPEG 2000 until the moving picture recording ends.

On the other hand, the compression rate being less than or equal to the threshold indicates that the user wishes to prioritize avoiding the occurrence of color noise. Accordingly, the plane determining unit 1104 sets the RAW data to undergo the transforming process by the first plane transforming unit 102 (step S1204). As a result, the first plane group {R, G0, G1, B} generated by the first plane transforming unit 102 is encoded according to JPEG 2000 until the moving picture recording ends.

As described thus far, according to the present fourth embodiment, the RAW data is transformed into the first plane group {R, G0, G1, B} and encoded in the case where the user desires a high image quality even if the compression rate is low. The influence when carrying out color grading after the user has decoded and developed the image can be reduced as a result. On the other hand, users who will not apply extreme levels of color grading can set a higher compression rate, which makes it possible to suppress a drop in image quality caused by a drop in resolution and also reduce the size of the encoded file. In the fourth embodiment, the target for recording may be a moving picture or a still image. Additionally, the encoding process according to the fourth embodiment may be implemented by a computer program.

Fifth Embodiment

A fifth embodiment will now be described. Like the first embodiment, the present fifth embodiment describes an example in which the invention is applied in an image capturing apparatus. The configuration of the image capturing apparatus is the same as in the first embodiment, as indicated in FIG. 15. Thus the fifth embodiment will also describe a RAW data encoding unit in the image processing unit 1509.

Figure 13:
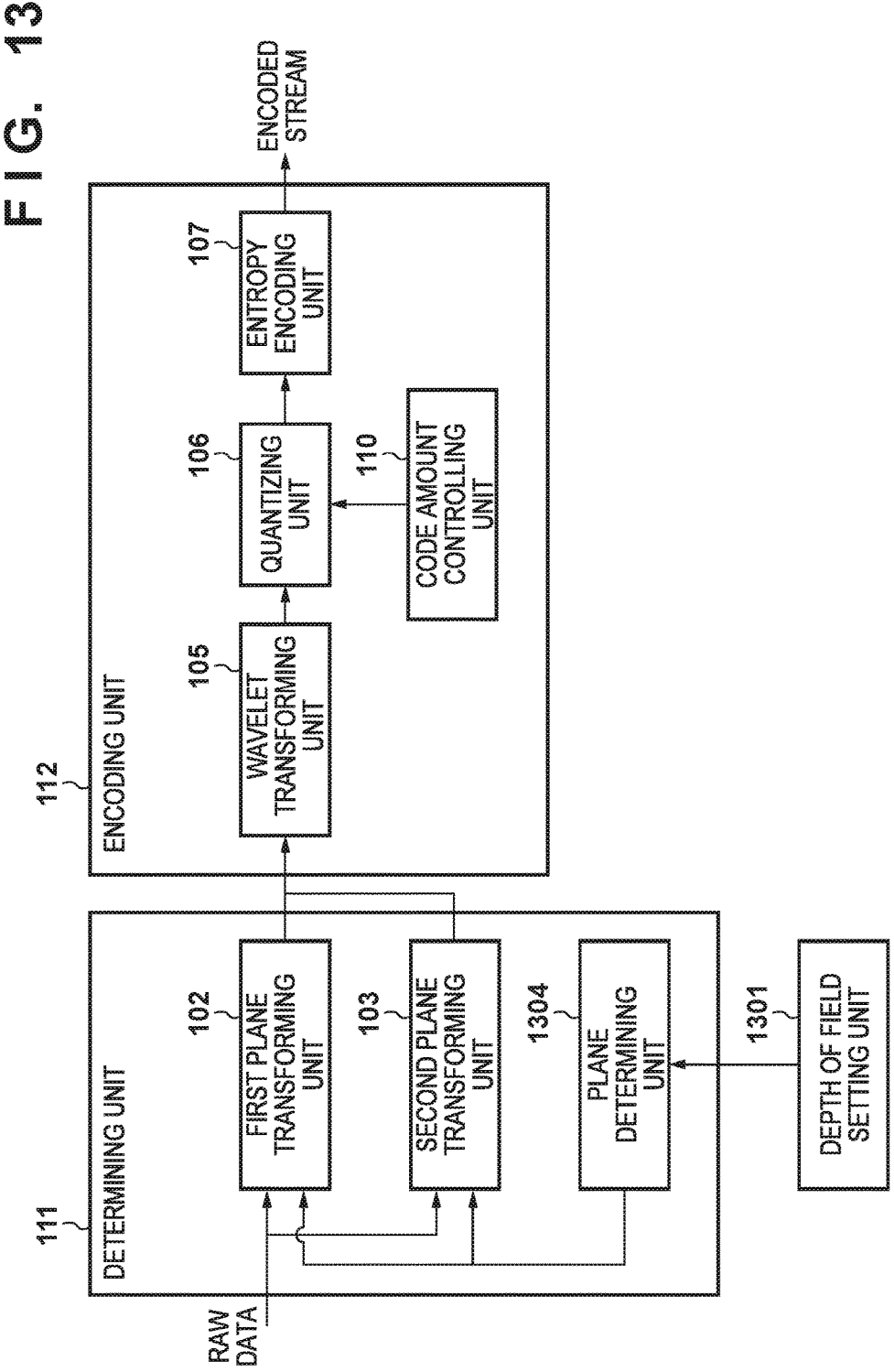
FIG. 13 is a block diagram illustrating a RAW data encoding unit according to a fifth embodiment.

FIG. 13 is a block diagram illustrating the RAW data encoding unit according to the fifth embodiment. The differences from the fourth embodiment are the process of the determination performed by a plane determining unit 1304, and that a depth of field setting unit 1301 is provided. No particular descriptions will be given for constituent elements indicated by the same reference numerals as in the embodiments described thus far. Like the fourth embodiment, the target of the encoding may be a moving picture or a still image (including burst images) in the fifth embodiment.

Figure 14:
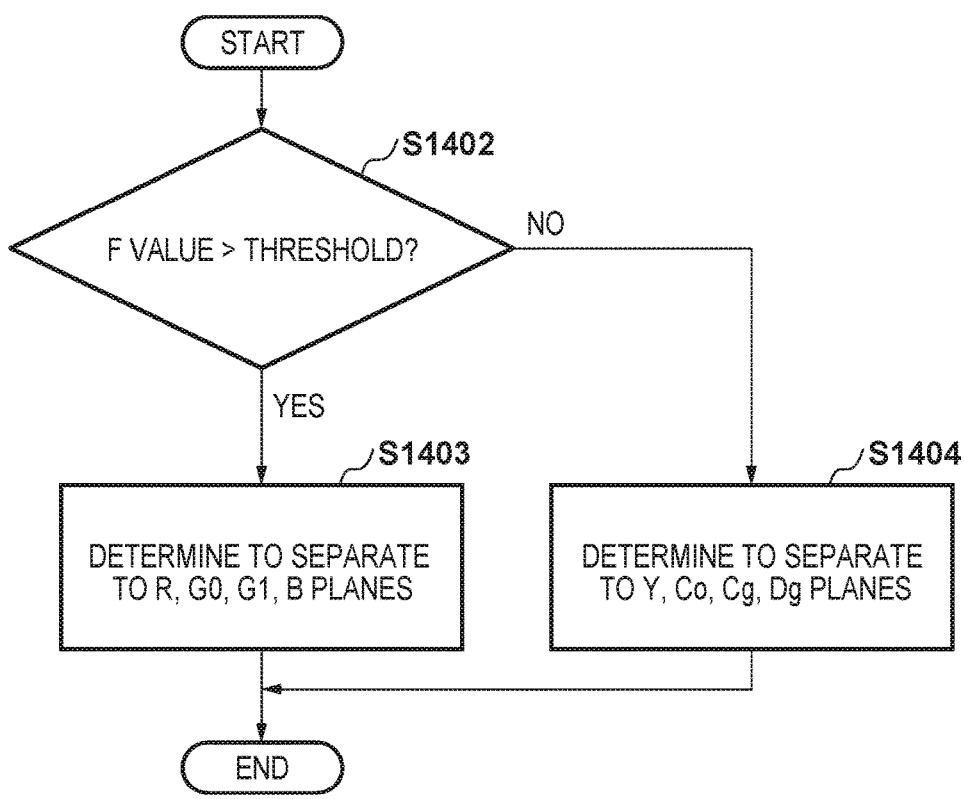
FIG. 14 is a flowchart illustrating a sequence of processing performed by a plane determining unit according to the fifth embodiment.

The depth of field setting unit 1301 sets an F value, determined by a zoom ratio, aperture, and the like set in the image capturing unit 1506 according to operations made through the operating unit 1504 by the user, in the plane determining unit 1304. In the case where the depth of field is shallow and the background is out of focus, the amplitude is low, irrespective of the color difference, in many areas of the RAW image data to be encoded. Accordingly, color noise will not arise or will arise only to an extend that can be ignored. The RAW data is therefore transformed into the second plane group {Y, Co, Cg, Dg} and encoded in the case where the depth of field is shallow. On the other hand, the amplitude of the color difference may increase in the case where the depth of field is deep. The RAW data is therefore transformed into the first plane group {R, G0, G1, B} and encoded. Processing performed by the plane determining unit 1304 according to the present fifth embodiment will be described next according to the flowchart in FIG. 14.

Upon receiving an instruction to start moving picture recording, in step S1402, the plane determining unit 1304 compares the F value set by the depth of field setting unit 1301 with a pre-set threshold. In the case where the F value is greater than the threshold, the plane determining unit 1304 sets the RAW data to undergo the transforming process by the first plane transforming unit 102 (step S1403). As a result, the first plane group {R, G0, G1, B} generated by the first plane transforming unit 102 is encoded according to JPEG 2000 until the moving picture recording ends. On the other hand, in the case where the F value is less than or equal to the threshold, the plane determining unit 1304 sets the RAW data to undergo the transforming process by the second plane transforming unit 103 (step S1404). As a result, the second plane group {Y, Co, Cg, Dg} generated by the second plane transforming unit 103 is encoded according to JPEG 2000 until the moving picture recording ends.

Thus according to the present fifth embodiment, in the case where the user has made an operation that will affect the depth of field set when capturing an image, encoding suited to the captured image can be applied without any particular attention on the part of the user. Additionally, the encoding process according to the fifth embodiment may be implemented by a computer program.

Sixth Embodiment

In the above-described first to fifth embodiments, when encoding Bayer array RAW data, the RAW data is determined to be transformed into the first plane group {R, G0, G1, B} or the second plane group {Y, Co, Cg, Dg} and is then encoded.

The present sixth and subsequent embodiments will describe an example in which the RAW data is transformed into the second plane group {Y, Co, Cg, Dg} and encoded. In the present sixth embodiment, a code amount allocated to each plane in the second plane group {Y, Co, Cg, Dg} is determined by analyzing the color difference Co, Cg, and Dg planes, so as to suppress a drop in image quality and an increase in code amounts. Like the first embodiment, the present sixth embodiment describes an example in which the invention is applied in an image capturing apparatus. The configuration of the image capturing apparatus is the same as in the first embodiment, as indicated in FIG. 15. Thus the present second embodiment will also describe a RAW data encoding unit in the image processing unit 1509.

Figure 18:
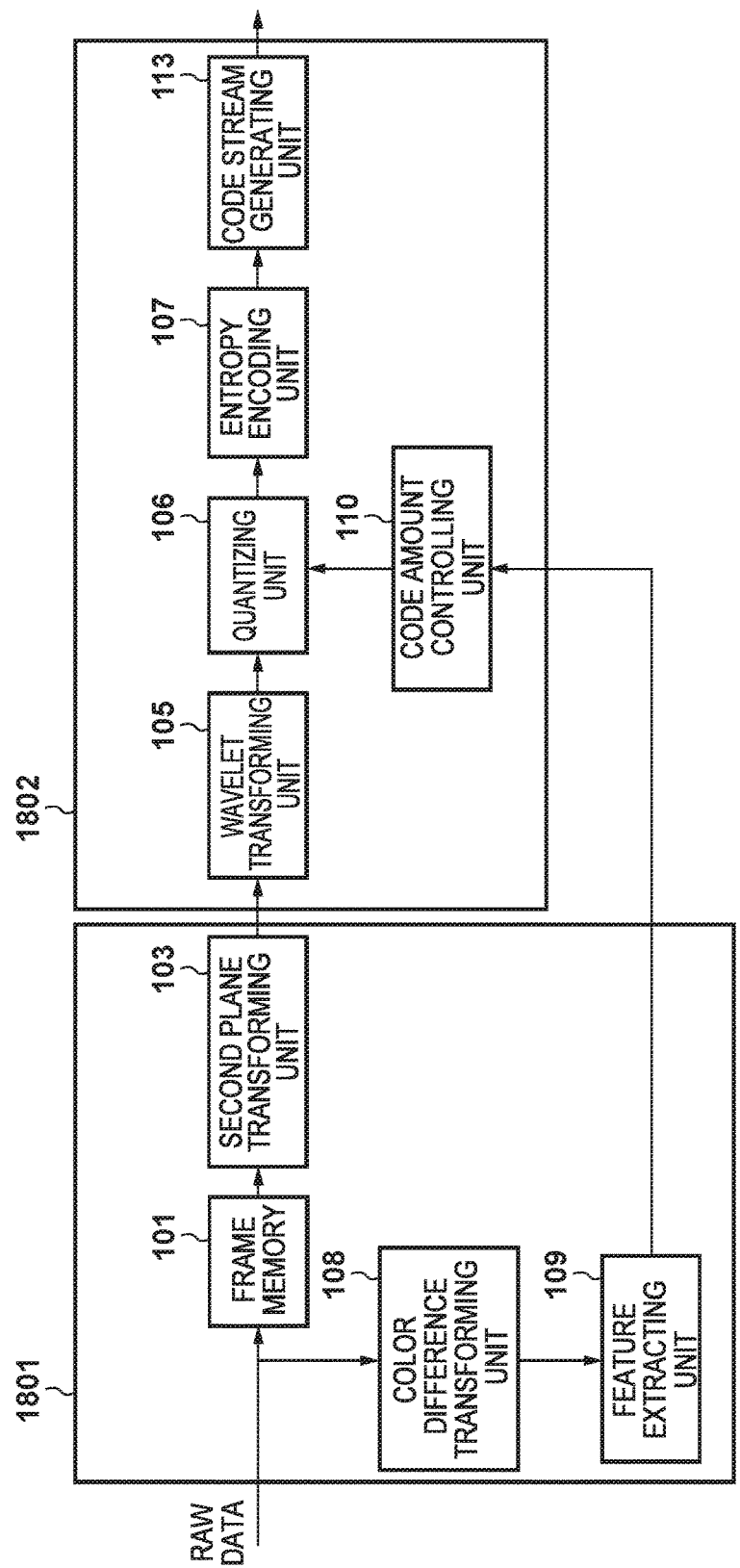
FIG. 18 is a block diagram illustrating a RAW data encoding unit according to a sixth embodiment.

FIG. 18 is a block diagram illustrating a RAW data encoding unit according to the present sixth embodiment. As illustrated in FIG. 18, the RAW data encoding unit according to the present sixth embodiment is constituted of a pre-processing unit 1801 and an encoding unit 1802. The pre-processing unit 1801 includes the frame memory 101, the second plane transforming unit 103, the color difference transforming unit 108, and the feature extracting unit 109. The encoding unit 1802, meanwhile, includes the wavelet transforming unit 105, the quantizing unit 106, the entropy encoding unit 107, the code amount controlling unit 110, and the code stream generating unit 113. Constituent elements substantially the same as the constituent elements described in the first embodiment with reference to FIG. 1 are given the same reference numerals and will not be described. Processing performed in the sixth embodiment will be described next.

When the user instructs the start of moving picture recording through the operating unit 1504, the Bayer array RAW data is stored in the frame memory 101 in time series. The second plane transforming unit 103 transforms the RAW data stored in the frame memory 101 into the second plane group {Y, Co, Cg, Dg} through the computations indicated in the aforementioned Formula (1), and supplies the respective planes in order to the encoding unit 1802.

The wavelet transforming unit 105 in the encoding unit 1802 performs a wavelet transform each time a single plane is supplied from the second plane transforming unit 103. The wavelet transforming unit 105 then supplies the sub-bands LL, HL, LH, and HH obtained from the transforms to the quantizing unit 106. The quantizing unit 106 quantizes each piece of transform coefficient data of each sub-band supplied from the wavelet transforming unit 105 using quantizing parameters according to a target code amount set by the code amount controlling unit 110. The quantizing unit 106 then supplies the quantized transform coefficients to the entropy encoding unit 107. The entropy encoding unit 107 carries out entropy encoding on the transform coefficient data quantized by the quantizing unit 106, on a sub-band by sub-band basis, and supplies the encoded data obtained from that encoding to the code stream generating unit 113. The code stream generating unit 113 includes an internal buffer memory; the code stream generating unit 113 temporarily holds the encoded data from the entropy encoding unit 107, links the encoded data of each plane in a predetermined order, generates a header as necessary, and outputs the resulting code stream to a write buffer (not shown) allocated in the RAM 1503.

As is clear from the foregoing descriptions, the code amount of the second plane group {Y, Co, Cg, Dg} obtained by transforming the RAW data depends on the target code amount set by the code amount controlling unit 110. Accordingly, the way in which the target code amount is determined for each plane will be described in further detail next.

Prior to the encoding unit 1802 encoding the RAW data of interest, the color difference transforming unit 108 calculates the color differences Co, Cg, and Dg from that RAW data of interest. The color difference transforming unit 108 includes an internal buffer, and holds the calculated color differences Co, Cg, and Dg in that internal buffer. As a result, the Co plane, the Cg plane, and the Dg plane are generated in the internal buffer of the color difference transforming unit 108.

The feature extracting unit 109 calculates the variances VarCo, VarCg, and VarDg of the three color difference planes held in the internal buffer of the color difference transforming unit 108 according to Formula (2). Furthermore, the feature extracting unit 109 calculates a sum VarSum of the calculated variances of the color difference components, and supplies the calculated sum VarSum to the code amount controlling unit 110.

$$\text{VarSum} = \text{Var}Co + \text{Var}Cg + \text{Var}Dg$$

The code amount controlling unit 110 determines a compression rate rate set by the user through the operating unit 1504, a bit depth bit_depth of the RAW image data, and a target code amount pic_code of a frame of interest from a horizontal resolution w and a vertical resolution h of the RAW data. Specifically, the following formula is used.

$$\text{pic\_code} = w \times h \times \text{bit\_depth} \times \text{rate}/100 \quad (4)$$

The code amount controlling unit 110 determines a code amount Y_code to be allocated to the luminance Y plane according to the following Formula (5), using the target code amount pic_code of the frame of interest calculated as described above and VarSum supplied from the feature extracting unit 109.

if Varmax<VarSum, Y_code=pic_code×α if Varmin≤VarSum≤Varmax, Y_code=pic_code×β/Var_Sum if VarSum<Varmin, Y_code=pic_code×γ   (5)

Here, α, β, and γ are predetermined coefficients, and Varmax and Varmin are predetermined thresholds. Note that α<γ, 0<α<1, and 0<γ<1. Additionally, α=β/Varmax and γ=β/Varmin.

The target code amounts allocated to the three color difference planes are calculated on the basis of a remainder obtained by subtracting the target code amount Y_code of the luminance Y plane from the target code amount pic_code of the frame of interest. In this embodiment, the code amount to be allocated in determined depending on the magnitudes of the variances of each color difference plane. Specifically, the code amount controlling unit 110 determines code amounts (target code amounts) Co_code, Cg_code, and Dg_code allocated to the respective planes of the color differences Co, Cg, and Dg through the following Formula (6).

$$Co\_code = (\text{pic\_code} - Y\_code) \times \text{Var}Co/\text{VarSum}$$

$$Cg\_code = (\text{pic\_code} - Y\_code) \times \text{Var}Cg/\text{VarSum}$$

$$Dg\_code = (\text{pic\_code} - Y\_code) \times \text{Var}Dg/\text{VarSum} \quad (6)$$

When the sub-band of the Y plane of the frame of interest is supplied to the quantizing unit 106 from the wavelet transforming unit 105, the code amount controlling unit 110 sets the target code amount Y_code in the quantizing unit 106. As a result, the quantizing unit 106 quantizes each sub-band of the Y plane according to a quantizing step specified by a parameter corresponding to the target code amount Y_code that has been set. Likewise, when the sub-band of the Co plane of the frame of interest is supplied to the quantizing unit 106 from the wavelet transforming unit 105, the code amount controlling unit 110 sets the target code amount Co_code in the quantizing unit 106. As a result, the quantizing unit 106 quantizes each sub-band of the Co plane according to a quantizing step specified by a parameter corresponding to the target code amount Co_code that has been set. The same applies to the Cg and Dg planes.

By controlling the code amount in this manner, in the case where the variances of the color differences are high and the code amounts and amplitudes of the color differences produced during encoding are high, a greater code amount can be allocated to those color components and the occurrence of color noise can be suppressed. On the other hand, in the case where the variances of the color differences are low, a greater code amount can be allocated to the luminance and the resolution can be increased without producing color noise, making it possible to suppress a drop in subjective image quality.

Although the sixth embodiment describes calculating the variances in all three of the Co, Cg, and Dg color difference planes, the number of color difference planes for which to calculate the variances may be narrowed down, such as using only Co and Cg, for example. The planes are narrowed down to Co and Cg because Dg corresponds to a difference between G0 and G1, has a stronger quality as an edge in a diagonal direction of the G component than as a color difference, and has comparatively little effect on the occurrence of color noise. In this case, VarSum is calculated as a sum of VarCo and VarCg, and β, Varmax, and Varmin in Formula (4) are adjusted in light of the fact that VarDg is not added. In addition, when finding the code amount of the color differences, a method such as finding a difference between pic_code and Y_code, dividing into three equal parts, and allocating to the respective color difference planes may be used instead of Formula (5).

Variation on the Sixth Embodiment

An example in which the processing described above in the sixth embodiment is implemented by an application program run on a generic information processing apparatus such as a personal computer will be described next as a variation on the sixth embodiment.

A block diagram of the information processing apparatus to which the sixth embodiment is applied is the same as FIG. 17, and thus will not be described. However, the application program 1706 follows the present sixth embodiment.

Figure 19:
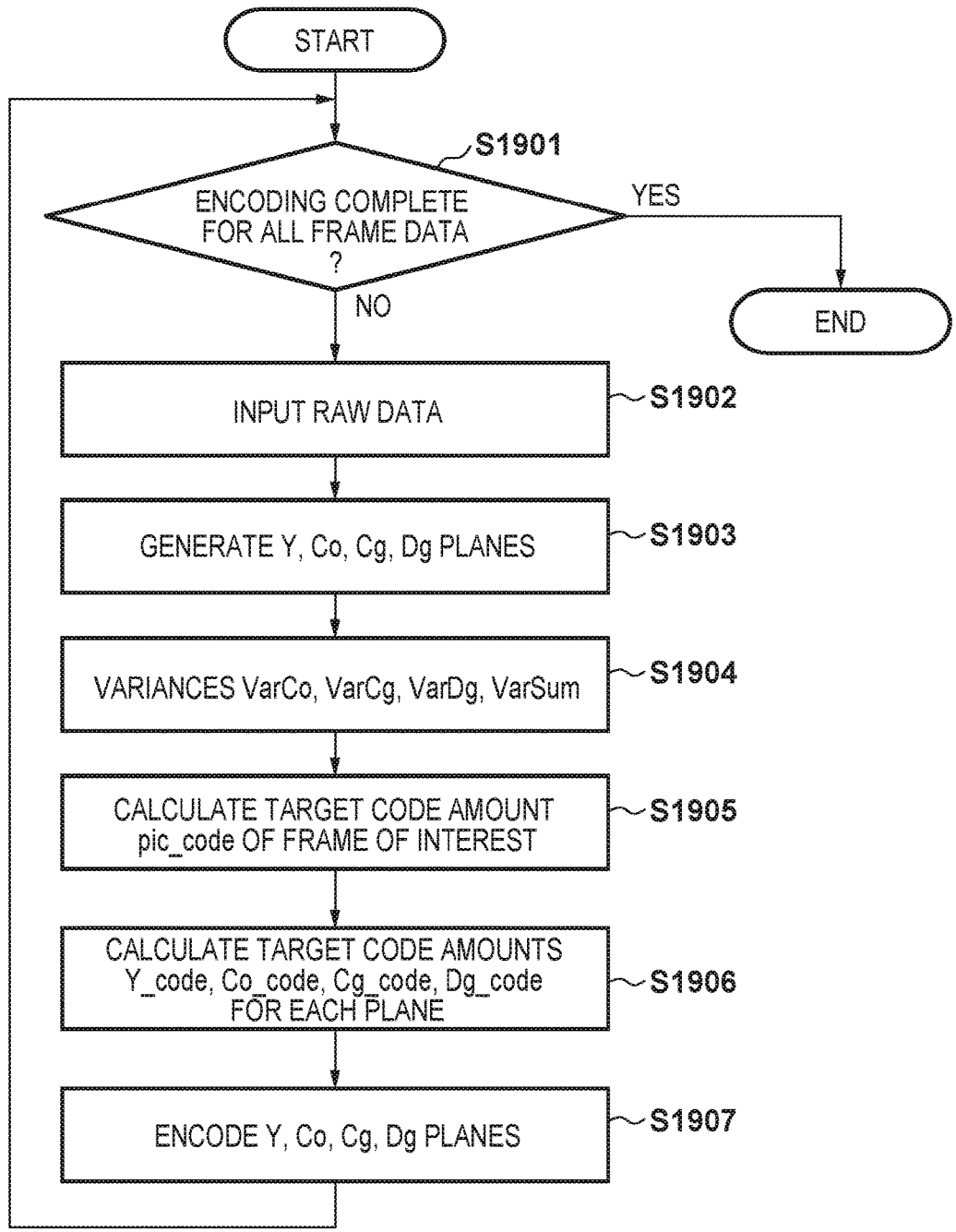
FIG. 19 is a flowchart illustrating an encoding process according to a variation on the sixth embodiment.

A sequence of processes carried out when the CPU 1701 executes the application program 1706 will be described according to the flowchart in FIG. 19. The following will also describe an example in which unencoded RAW data contained in the RAW data file 1707 stored in the HDD 1704 is encoded so as to generate the encoded file 1708. It is also assumed that data regarding the horizontal direction resolution and vertical direction resolution of the RAW data and a bit number of a single pixel is set in the file header of the RAW data file 1707. Furthermore, it is assumed that the user has set the compression rate using the keyboard 1709 or the mouse 1710.

First, in step S1901, the CPU 1701 determines whether or not the encoding process is complete for all of the RAW data in the RAW data file 1707. In the case where the encoding process is not complete, in step S1902, the CPU 1701 inputs a single frame's worth of RAW data from the RAW data file 1707 and holds that data in the RAM 1703. Then, in step S1903, the CPU 1701 calculates the luminance Y and the color differences Co, Cg, and Dg through Formula (1) by referring to the RAW data held in the RAM 1703. The CPU 1701 holds the calculated luminance Y and three color differences Co, Cg, and Dg in respective storage regions for the Y, Co, Cg, and Dg planes allocated in the RAM 1703. The second plane group {Y, Co, Cg, Dg} is generated in the RAM 1703 by executing this processing for all of the pixels in the RAW data. In step S1904, the CPU 1701 calculates the variances VarCo, VarCg, and VarDg for the respective planes according to Formula (2) by referring to the planes of the color differences Co, Cg, and Dg held in the RAM 1703. The CPU 1701 also calculates VarSum by adding the variances VarCo, VarCg, and VarDg.

Next, in step S1905, the CPU 1701 calculates the target code amount pic_code of the frame of interest according to Formula (4). Then, in step S1906, the CPU 1701 calculates the target code amount Y_code of the luminance Y plane according to Formula (5). In addition, the CPU 1701 calculates the target code amounts Co_code, Cg_code, and Dg_code for the planes of the color differences Co, Cg, and Dg, respectively, according to Formula (6). Then, in step S1907, the CPU 1701 carries out the encoding process based on JPEG 2000 so that the luminance Y plane already held in the RAM 1703 acquires the target code amount Y_code. The CPU 1701 temporarily holds the encoded data of the luminance Y plane obtained from the encoding in the RAM 1703. Likewise, the CPU 1701 carries out the encoding process based on JPEG 2000 so that the Co, Cg, and Dg color difference planes acquire the target code amounts Co_code, Cg_code, and Dg_code, respectively. The generated encoded data is temporarily held in the RAM 1703. The CPU 1701 joins the generated encoded data in a predetermined order and adds the joined encoded data to the encoded file 1708.

As described thus far, a RAW image encoded file providing the same effects as described in the sixth embodiment can also be generated by causing a computer to run a computer program.

Seventh Embodiment

Figure 20:
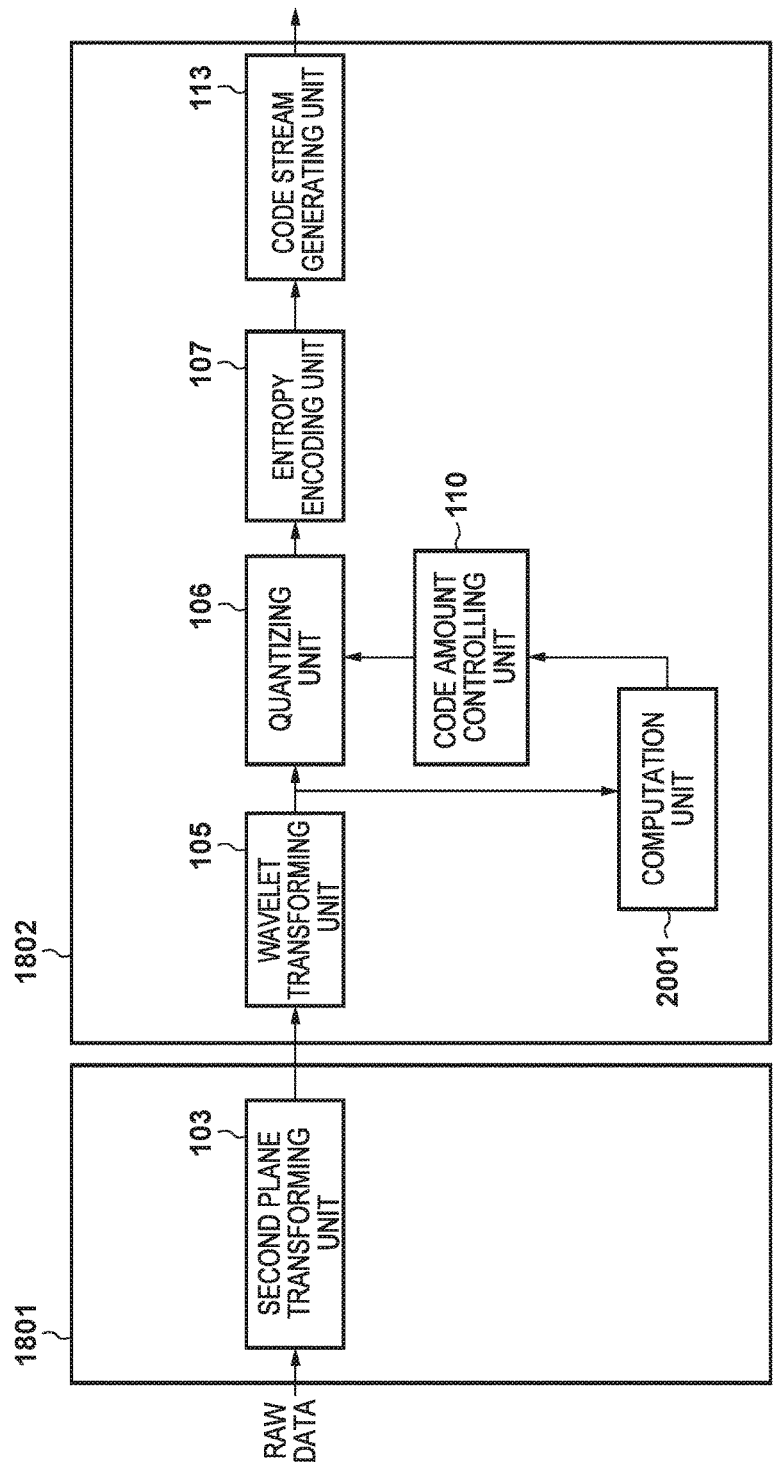
FIG. 20 is a block diagram illustrating a RAW data encoding unit according to a seventh embodiment.

A seventh embodiment will now be described. Like the first embodiment, the present seventh embodiment describes an example in which the invention is applied in an image capturing apparatus. The configuration of the image capturing apparatus is the same as in the first embodiment, as indicated in FIG. 15. In the present seventh embodiment, the code amounts allocated to the second plane group {Y, Co, Cg, Dg} are determined from the target code amount of a frame of interest, in the same manner as in the sixth embodiment. FIG. 20 is a block diagram illustrating a RAW data encoding unit according to the seventh embodiment. The differences from the sixth embodiment described with reference to FIG. 18 are that the frame memory 101, the color difference transforming unit 108, and the feature extracting unit 109 have been omitted, and a computation unit 2001 has been provided. The rest is the same as in the sixth embodiment and will therefore not be described.

In response to an instruction from the code amount controlling unit 110, the computation unit 2001 calculates a sum Wh_SumCo of the transform coefficients of the sub-bands HL, LH, and HH in the color difference Co generated by the wavelet transforming unit 105. The computation unit 2001 also calculates a sum Wh_SumCg of the transform coefficients of the sub-bands HL, LH, and HH in the color difference Cg and a sum Wh_SumDg of the transform coefficients of the sub-bands HL, LH, and HH in the color difference Dg.

Figure 21:
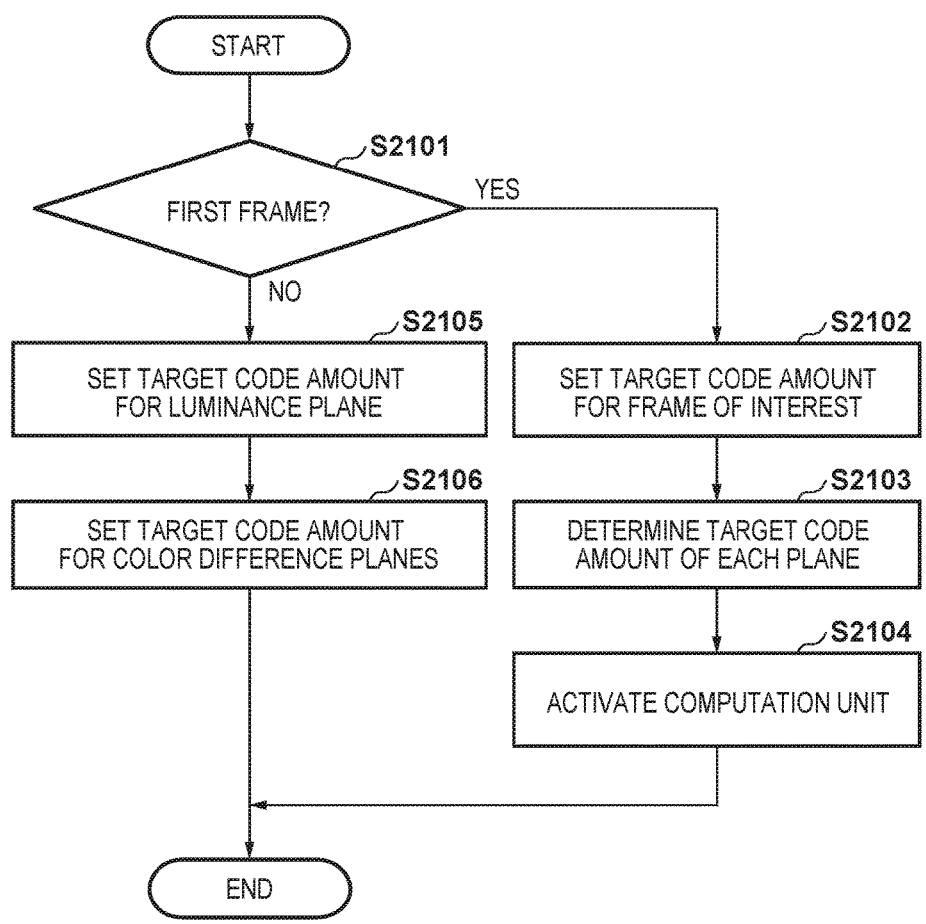
FIG. 21 is a flowchart illustrating a sequence of processing performed by a code amount controlling unit according to the seventh embodiment.

A sequence of processing performed in the present seventh embodiment will be described next according to the flowchart in FIG. 21.

The code amount controlling unit 110 determines whether or not the RAW data of interest is the first frame after the start of moving picture recording (step S2101). In the case where the RAW data of interest is the first frame, in step S2102, the code amount controlling unit 110 calculates the target code amount pic_code of the frame on the basis of Formula (4). Then, in step S2103, the code amount controlling unit 110 calculates the target code amount of each plane in the first frame according to the following Formula (7).

$$Y\_code = pic\_code \times a$$

$$Co\_code = pic\_code \times b$$

$$Cg\_code = pic\_code \times c$$

$$Dg\_code = pic\_code \times d \qquad (7)$$

Here, a, b, c, and d are coefficients set in advance, and a+b+c+d=1. In other words, the coefficients a, b, c, and d indicate percentages allocated to the respective planes. When encoding the first frame, there is no index for appropriately determining the code amounts of the respective planes. As such, the coefficients b, c, and d are set relatively higher so as to reduce the likelihood of color noise arising. It should be noted that the calculations in steps S2102 and S2103 are carried out regardless of the actual planes encoded first. When encoding the first plane, the code amount controlling unit 110 sets the target code amounts of the planes determined through Formula (7) in the quantizing unit 106. The encoding process for the RAW data in the first frame of the moving picture is carried out as a result.

Meanwhile, the code amount controlling unit 110 activates the computation unit 2001 when encoding the first frame (step S2104). The process of step S2104 can be called a preparation process for determining the target code amounts of the respective planes when encoding the RAW data of the second and subsequent frames of the moving picture recording. As a result of the process of step S2104, the computation unit 2001 calculates the sum Wh_SumCo of the transform coefficients of the sub-bands HL, LH, and HH obtained from the color difference Co plane in the first frame. Likewise, the computation unit 2001 calculates the sum Wh_SumCg of the transform coefficients of the sub-bands HL, LH, and HH obtained from the color difference Cg plane in the first frame. Furthermore, the computation unit 2001 calculates the sum Wh_SumDg of the transform coefficients of the sub-bands HL, LH, and HH obtained from the color difference Dg plane in the first frame.

In the case where it is determined that the frame of interest is the second frame after the start of the moving picture recording, the code amount controlling unit 110 advances the process to step S2105. In step S2105, the code amount controlling unit 110 obtains, from the computation unit 2001, Wh_sumCo, Wh_sumCg, and Wh_sumDg found from the first frame, and calculates a sum Wh_sum thereof. The code amount controlling unit 110 then calculates the target code amount Y_code of the luminance Y plane according to the following Formula (8), on the basis of pic_code calculated when encoding the first frame and Wh_sumCo, Wh_sumCg, Wh_sumDg, and Wh_sum.

if $Whmax < Wh\_Sum, Y\_code = pic\_code \times \alpha$ if $Whmin \le Wh\_Sum \le Whmax, Y\_code = pic\_code \times \beta / Wh\_Sum$ if $Wh\_Sum < Whmin, Y\_code = pic\_code \times \gamma$ (8)

Here, α, β, and γ are predetermined coefficients, and Whmax and Whmin are predetermined thresholds. Note that $\alpha < \gamma$, $0 < \alpha < 1$, and $0 < \gamma < 1$. Additionally, $\alpha = \beta / Whmax$ and $\gamma = \beta / Whmin$.

Then, in step S2106, the code amount controlling unit 110 calculates the target code amounts Co_code, Cg_code, and Dg_code of the planes of the color differences Co, Cg, and Dg in accordance with percentages of the totals of the absolute values of the respective planes, in accordance with the following Formula (9).

$Co\_code = (pic\_code - Y\_code) \times Wh\_SumCo / Wh\_Sum$ $Cg\_code = (pic\_code - Y\_code) \times Wh\_SumCg / Wh\_Sum$ $Dg\_code = (pic\_code - Y\_code) \times Wh\_SumDg / Wh\_Sum$ (9)

In this manner, the code amount controlling unit 110 determines the target code amounts of the planes in the second plane group {Y, Co, Cg, Dg} for the second and subsequent frames of the moving picture. Accordingly, when encoding the RAW data of the second and subsequent frames, the code amount controlling unit 110 sets the target code amounts determined as described above in the quantizing unit 106 and causes the encoding process to be carried out.

In the case where the foregoing results in a high sum of the absolute values of the wavelet coefficients in the high-frequency regions of the color differences, the amplitudes of the color differences are high and it can thus be said that color noise is likely to arise. In this situation, controlling the code amounts as described in the present seventh embodiment makes it possible to suppress the occurrence of color noise by increasing the code amounts allocated to the respective color difference planes. On the other hand, in the case where there is a low sum of the absolute values of the wavelet coefficients in the high-frequency regions of the color differences, the resolution can be increased, and the subjective image quality can in turn be increased, by allocating a greater code amount to the luminance Y plane.

Note that with respect to the first frame of the moving picture recording, the seventh embodiment uses features of the image from the time when the shooting is started rather than features of the image to be encoded themselves. It is thus more likely for the first frame to experience a drop in image quality than in the sixth embodiment. However, a frame memory is not required and no memory accesses are made, which makes it easy to implement the processing in real time even for high-framerate moving pictures.

Additionally, although the sum of the absolute values of the wavelet coefficients are only computed at the start of shooting in the seventh embodiment, this computation may be carried out parallel to the frame encoding, and the sum may then be used to set the target code amount of each plane in the next frame. Additionally, the number of color difference planes from which to calculate the sum of the absolute values of the wavelet coefficients may be narrowed down, such as using only the Co and Cg color difference planes, in the seventh embodiment as well, in the same manner as in the sixth embodiment. Furthermore, the encoding process according to the above-described seventh embodiment may be implemented by a computer program.

Eighth Embodiment

A eighth embodiment will now be described. Like the first embodiment, the present eighth embodiment describes an example in which the invention is applied in an image capturing apparatus. The block diagram of the RAW data encoding unit according to the present eighth embodiment is the same as that of the seventh embodiment. However, it is assumed that the wavelet transforming unit 105 executes two wavelet transforms on a single plane. The details of the processing performed by the computation unit 2001 and the code amount controlling unit 110 also differ from those of the seventh embodiment. Note that by carrying out two wavelet transforms, the wavelet transforming unit 105 generates transform coefficient data for sub-bands LL, HL2, LH2, HH2, HL1, LH2, and HH1.

In the present eighth embodiment, upon being activated by the code amount controlling unit 110, the computation unit 2001 carries out computations on the transform coefficients of the Co, Cg, and Dg color difference planes transformed by the wavelet transforming unit 105. Specifically, the computation unit 2001 computes an absolute value sum for the transform coefficient data of each of the sub-bands HL1, LH1, HH1, HL2, LH2, and HH2, with the exception of the sub-band LL. The absolute value sums of the sub-bands in the color difference Co plane are represented by Wh_sumCoHH1, Wh_sumCoHL1, Wh_sumCoLH1, Wh_sumCoHH2, Wh_sumCoHL2, and Wh_sumCoLH2, respectively. The absolute value sums of the sub-bands in the color difference Cg plane are represented by Wh_sumCgHH1, Wh_sumCgHL1, Wh_sumCgLH1, Wh_sumCgHH2, Wh_sumCgHL2, and Wh_sumCgLH2, respectively. The absolute value sums of the sub-bands in the color difference Dg plane are represented by Wh_sumDgHH1, Wh_sumDgHL1, Wh_sumDgLH1, Wh_sum- DgHH2, Wh_sumDgHL2, and Wh_sumDgLH2, respectively. The relationships of these notations to the planes and sub-bands are the same as in the third embodiment. Additionally, the computation unit 2001 supplies the 18 sums resulting from the above computations to the code amount controlling unit 110.

Figure 22:
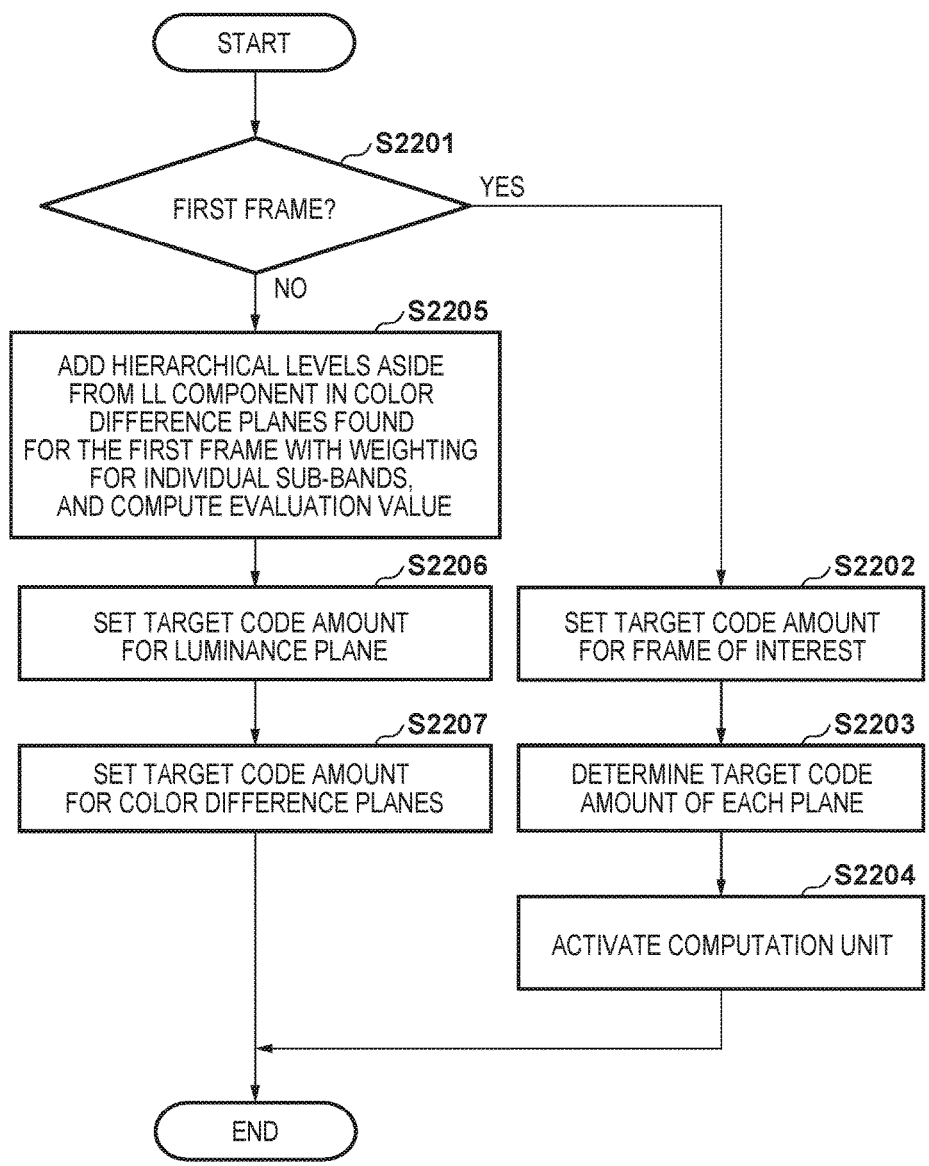
FIG. 22 is a flowchart illustrating a sequence of processing performed by a code amount controlling unit according to an eighth embodiment.

A sequence of processing performed by the code amount controlling unit 110 according to the present eighth embodiment will be described next according to the flowchart in FIG. 22.

The code amount controlling unit 110 determines whether or not the RAW data of interest is the first frame after the start of moving picture recording (step S2201). In the case where the RAW data of interest is the first frame, in step S2202, the code amount controlling unit 110 calculates the target code amount pic_code of the frame of interest on the basis of Formula (4). The code amount controlling unit 110 then calculates the target code amounts Y_code, Co_code, Cg_code, and Dg_code of the respective planes according to Formula (7), from the calculated target code amount pic_code (step S2203). Then, when encoding the first plane, the code amount controlling unit 110 sets the target code amounts of the planes calculated as described above and determined through Formula (7) in the quantizing unit 106. The encoding process for the RAW data in the first frame of the moving picture is carried out as a result.

Meanwhile, the code amount controlling unit 110 activates the computation unit 2001 when encoding the first frame (step S2204). The process of step S2204 can be called a preparation process for determining the target code amounts of the respective planes when encoding the RAW data of the second and subsequent frames of the moving picture recording. When the computation unit 2001 is activated, the 18 sums mentioned above are calculated from the planes of the color differences Co, Cg, and Dg, excluding the luminance Y plane transformed from the first frame. The computation unit 2001 then supplies the computed 18 sums to the code amount controlling unit 110.

In the case where it is determined that the frame of interest is not the first frame after the start of the moving picture recording, the code amount controlling unit 110 advances the process to step S2205. In step S2205, the code amount controlling unit 110 calculates evaluation values Wh_sumCo, Wh_sumCg, and Wh_sumDg according to Formula (3), on the basis of the 18 sums found from the first frame by the computation unit 2001.

The code amount controlling unit 110 then furthermore calculates, from the calculated evaluation values Wh_sumCo, Wh_sumCg, and Wh_sumDg, a total sum Wh_sum (=Wh_sumCo+Wh_sumCg+Wh_sumDg). Then, the code amount controlling unit 110 calculates the target code amount Y_code of the luminance Y plane for the second and subsequent frames, according to Formula (8) (step S2206). Then, in step S2207, the code amount controlling unit 110 calculates the target code amounts Co_code, Cg_code, and Dg_code of the planes of the color differences Co, Cg, and Dg in accordance with Formula (9). When encoding the RAW data of the second and subsequent frames, the code amount controlling unit 110 sets the target code amounts of the respective planes determined as described above in the quantizing unit 106 and causes the encoding process to be carried out.

In this manner, weighting the absolute value sums of the transform coefficient data according to the hierarchical level and sub-band makes it possible to control the code amounts more accurately. Although the absolute value sums of the transform coefficient data are computed only for the first frame in the moving picture recording in the eighth embodiment, these sums may be found each time a frame is encoded, and may then be used to set the target code amount of each plane in the next frame. Furthermore, the targets for calculating the sums of the absolute values of the transform coefficients obtained from the wavelet transforms may be narrowed down to only the planes of the color differences Co, Cg, and Dg in the eighth embodiment as well, in the same manner as in the sixth embodiment. Additionally, the encoding process according to the eighth embodiment may be implemented by a computer program.

Ninth Embodiment

A ninth embodiment will now be described. Like the first embodiment, the present ninth embodiment describes an example in which the invention is applied in an image capturing apparatus. The configuration of the image capturing apparatus is the same as in the first embodiment, as indicated in FIG. 15. Thus the ninth embodiment will also describe a RAW data encoding unit in the image processing unit 1509.

Figure 23:
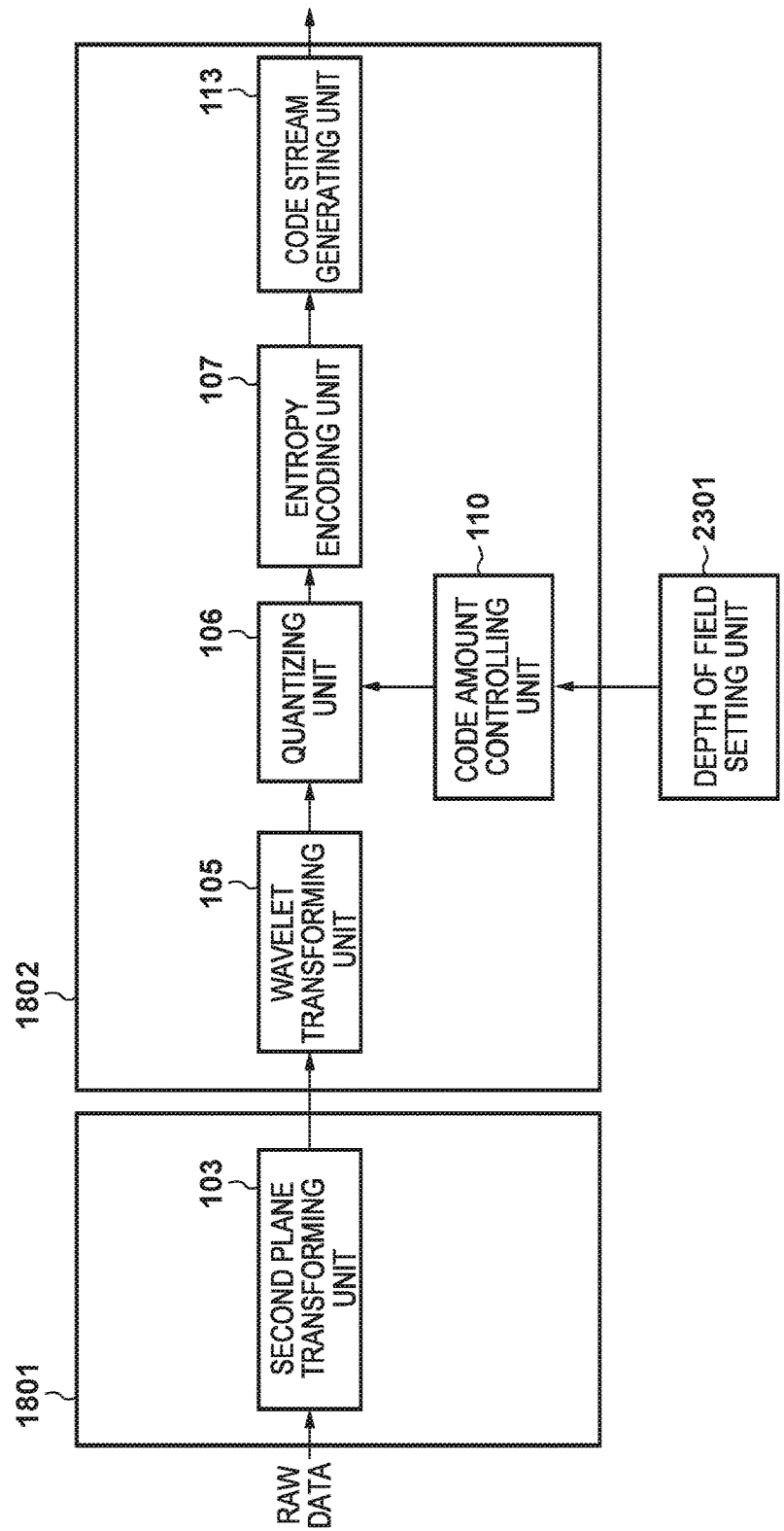
FIG. 23 is a block diagram illustrating a RAW data encoding unit according to a ninth embodiment.

FIG. 23 is a block diagram illustrating the RAW data encoding unit according to the ninth embodiment. The differences from the seventh embodiment are that the computation unit 2001 is omitted and that a depth of field setting unit 2301 is provided. Note that unlike the seventh embodiment, the target of the encoding may be a moving picture or a still image from a burst of still images in the ninth embodiment. Aside from the processing performed by the depth of field setting unit 2301 and the code amount controlling unit 110, the ninth embodiment is the same as the seventh embodiment, and thus corresponding descriptions will not be given.

Figure 24:
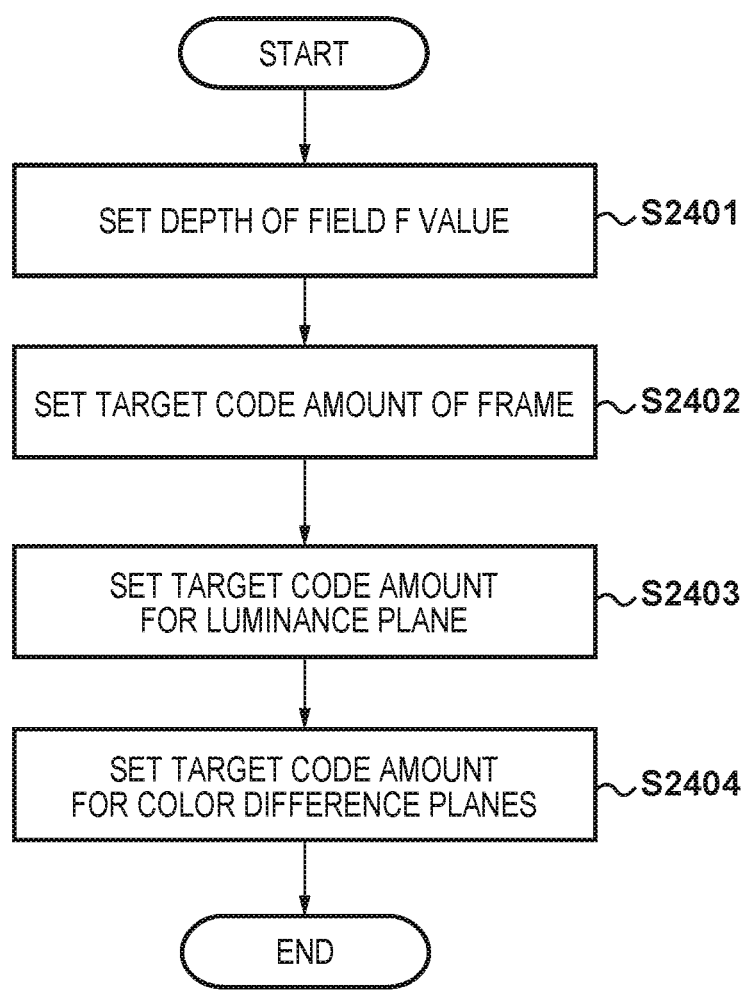
FIG. 24 is a flowchart illustrating a sequence of processing performed by a code amount controlling unit according to the ninth embodiment.

The depth of field setting unit 2301 sets an F value, determined by a zoom ratio, aperture, and the like set in the image capturing unit 1506 according to operations made through the operating unit 1504 by the user, in the code amount controlling unit 110. In light of this point, details of processing performed by the code amount controlling unit 110 according to the present ninth embodiment will be described next according to the flowchart in FIG. 24.

In step S2401, the code amount controlling unit 110 loads the F value set by the depth of field setting unit 2301. Then, in step S2402, the code amount controlling unit 110 calculates the target code amount pic_code for a single frame on the basis of Formula (4) mentioned earlier, from the compression rate rate set by the user through the operating unit 1504, the bit depth bit_depth of the RAW data, and the horizontal resolution w and vertical resolution h of the RAW data.

Then, in step S2403, the code amount controlling unit 110 calculates the target code amount Y_code of the luminance plane from the calculated pic_code and F value, according to the following Formula (10).

$$\text{if } \alpha/F > \beta, Y\_code = pic\_code \times \alpha/F$$

$$\text{if } \alpha/F \leq \beta, Y\_code = pic\_code \times \beta \quad (10)$$

Here, $\alpha$ and $\beta$ are predetermined coefficients, and assuming Fmin represents a minimum value of the F value, $\alpha/Fmin < 1$.

Next, in step S2404, the code amount controlling unit 110 allocates three equal parts of a difference between pic_code and Y_code, or in other words, pic_code−Y_code, to the target code amounts Co_code, Cg_code, and Dg_code of the respective color difference planes.

Co_code={pic_code−Y_code}/3

Cg_code={pic_code−Y_code}/3

Dg_code={pic_code−Y_code}/3

In the case where the depth of field is shallow and the background is out of focus, the amplitude is low, irrespective of the color difference, in many areas of the RAW image data to be encoded, and thus color noise is unlikely to arise. Accordingly, in the case where the depth of field is shallow, a greater code amount is allocated to the luminance plane so as to increase the resolution and increase the subjective image quality. On the other hand, in the case where the depth of field is deep, it is possible that the amplitudes of the color difference will increase, and thus the occurrence of color noise is suppressed by reducing the code amount allocated to the luminance and allocating greater code amounts to the color difference planes. Additionally, the encoding process according to the ninth embodiment may be implemented by a computer program.

Tenth Embodiment

A tenth embodiment will now be described. Like the first embodiment, the present tenth embodiment describes an example in which the invention is applied in an image capturing apparatus. The configuration of the image capturing apparatus is the same as in the first embodiment, as indicated in FIG. 15. Thus the tenth embodiment will also describe a RAW data encoding unit in the image processing unit 1509.

The determination unit 111 in the tenth embodiment switches the planes to be provided to the encoding unit 112 based on whether a still picture recording mode for recording RAW data as a still picture or a moving picture recording mode for recording the RAW data as a moving picture is set as a recoding mode by a user. In the still picture recording mode, the first plane transforming unit 102 transforms the input RAW data into the first plane group {R, G0, G1, B}, then, the encoding unit 112 encodes the first plane group {R, G0, G1, B}. In the moving picture recording mode, the second plane transforms the input RAW data into the second plane group {Y, Co, Cg, Dg}, then, the encoding unit 112 encodes the second plane group {Y, Co, Ch, Dg}. In the moving picture recording mode, a plurality of RAW images are recorded. According to the tenth embodiment, in the moving picture recording mode, the each RAW image is transformed into the second plane group {Y, Co, Cg, Dg} before performing the encoding. Therefore, it makes it possible to encode the RAW images efficiently and to reduce the encoded data amount.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-211103, filed Oct. 27, 2015, which is hereby incorporated by reference herein in its entirety.

What is claimed is:

1. An encoding apparatus that encodes Bayer array RAW image data, the apparatus comprising:
a memory configured to store a program; and
one or more processors configured to execute the program stored in the memory,
wherein the one or more processors function as units comprising:
(1) a first transforming unit that transforms RAW image data into a first plane group constituted of a total of four planes, the four planes being an R plane constituted of an R component, a G0 plane constituted of a G0 component, a G1 plane constituted of a G1 component, and a B plane constituted of a B component;
(2) a second transforming unit that transforms RAW image data into a second plane group constituted of a total of four planes, the four planes including one luminance plane constituted of a luminance component and three color difference planes each of which is constituted of a color difference component, respectively different from each other;
(3) a RAW encoding unit that encodes each plane included in the first plane group or the second plane group by performing, for each plane, (a) wavelet transform to generate transform coefficients, (b) quantization on the generated transform coefficients, and (c) entropy encoding on the quantized transform coefficients; and
(4) a control unit that performs control so as to provide either the first plane group or the second plane group to the RAW encoding unit to encode the RAW image data,
wherein, when encoding a plurality of continuously input RAW image frames, the control unit (a) performs control so as to provide, to the RAW encoding unit, the second plane group obtained from a first RAW image frame in the plurality of continuously input RAW image frames, and (b) determines which of the first plane group or second plane group to be obtained from a second RAW image frame following the first RAW image frame is provided to the RAW encoding unit, based on the transform coefficients obtained when the RAW encoding unit performs the wavelet transform on a plane included in the second plane group of the first RAW image frame.

2. The apparatus according to claim 1, wherein the units further comprise:
   a calculating unit that calculates, as a color difference evaluation value, for each color difference plane included in the second plane group of the first RAW image frame, a sum of absolute values of transform coefficients of sub-bands containing a high-frequency component obtained by performing the wavelet transform of planes in the second plane group,
   wherein in the case where the calculated color difference evaluation value is greater than a predetermined threshold, the control unit determines that the first plane group of the second RAW image frame is provided to the RAW encoding unit, and
   wherein in the case where the evaluation value is lower than the predetermined threshold, the control unit determines that the second plane group of the second RAW image frame is provided to the RAW encoding unit.

3. The apparatus according to claim 2, wherein the calculating unit calculates the color difference evaluation value by calculating the sum of the absolute values for each of sub-bands HL, LH, and HH that contain a high-frequency component and then multiplying a weighting coefficient set for each sub-band by each sum of the absolute values of the sub-bands.

4. The apparatus according to claim 1, wherein the units further comprise an input unit that sequentially inputs the plurality of continuously input RAW image frames,
   wherein, regarding RAW image frames following the second RAW image frame, the control unit determines that the same plane group as the plane group determined for the second RAW image frame is provided to the RAW encoding unit.

5. A method of controlling an encoding apparatus that encodes Bayer array RAW image data, the method comprising:
   transforming RAW image data into a first plane group constituted of a total of four planes, the four planes being an R plane constituted of an R component, a G0 plane constituted of a G0 component, a G1 plane constituted of a G1 component, and a B plane constituted of a B component;
   transforming RAW image data into a second plane group constituted of a total of four planes, the four planes including one luminance plane constituted of a luminance component and three color difference planes each of which is constituted of a color difference component, respectively different from each other;
   controlling so as to provide either the first plane group or the second plane group for encoding of the RAW image data, wherein the encoding encodes the provided one of the first plane group or the second plane group by performing, for each plane of the provided one of the first plane group or the second plane group, (a) wavelet transform to generate transform coefficients, (b) quantization on the generated transform coefficients, and (c) entropy encoding on the quantized transform coefficients, wherein, when encoding a plurality of continuously input RAW image frames, the controlling (1) controls so as to provide, for the encoding, the second plane group obtained from a first RAW image frame in the plurality of continuously input RAW image frames, and (2) determines which of the first or second plane group to be obtained from a second RAW image frame following the first RAW image frame is provided for the encoding, based on the transform coefficients obtained when the encoding performs the wavelet transform on a plane included in the second plane group of the first RAW image frame; and
   performing the encoding of the provided one of the first plane group or the second plane group.

6. A non-transitory computer-readable storage medium for causing a computer to execute steps of a method of controlling an encoding apparatus that encodes Bayer array RAW image data, the method comprising:
   transforming RAW image data into a first plane group constituted of a total of four planes, the four planes being an R plane constituted of an R component, a G0 plane constituted of a G0 component, a G1 plane constituted of a G1 component, and a B plane constituted of a B component;
   transforming RAW image data into a second plane group constituted of a total of four planes, the four planes including one luminance plane constituted of a luminance component and three color difference planes each of which is constituted of a color difference component, respectively different from each other;
   controlling so as to provide either the first plane group or the second plane group for encoding of the RAW image data, wherein the encoding encodes the provided one of the first plane group or the second plane group by performing, for each plane of the provided one of the first plane group or the second plane group, (a) wavelet transform to generate transform coefficients, (b) quantization on the generated transform coefficients, and (c) entropy encoding on the quantized transform coefficients, wherein, when encoding a plurality of continuously input RAW image frames, the controlling (1) controls so as to provide, for the encoding, the second plane group obtained from a first RAW image frame in the plurality of continuously input RAW image frames, and (2) determines which of the first or second plane group to be obtained from a second RAW image frame following the first RAW image frame is provided for the encoding, based on the transform coefficients obtained when the encoding performs the wavelet transform on a plane included in the second plane group of the first RAW image frame; and
   performing the encoding of the provided one of the first plane group or the second plane group.

* * * * *